US007917646B2

(12) United States Patent
Hum et al.

(10) Patent No.: US 7,917,646 B2

(45) Date of Patent: Mar. 29, 2011

(54) SPECULATIVE DISTRIBUTED CONFLICT RESOLUTION FOR A CACHE COHERENCY PROTOCOL

(75) Inventors: Herbert H. J. Hum, Portland, OR (US); James R. Goodman, Madison, WI (US); Robert H. Beers, Hillsboro, OR (US); Rajnish Ghughal, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 1843 days.

(21) Appl. No.: 10/325,427

(22) Filed: Dec. 19, 2002

(65) Prior Publication Data

US 2004/0122966 A1 Jun. 24, 2004

(51) Int. Cl.
*G06F 15/16* (2006.01)

(52) U.S. Cl. .................................................... 709/232

(58) Field of Classification Search ................. 709/208, 709/232; 711/146

See application file for complete search history.

(56) References Cited

U.S. PATENT DOCUMENTS 5,297,269 A 3/1994 Donaldson et al.
5,463,629 A 10/1995 Ko
5,557,767 A 9/1996 Sukegawa
5,623,644 A 4/1997 Self et al.
5,664,149 A 9/1997 Martinez, Jr. et al.
5,819,296 A 10/1998 Anderson et al.
5,860,111 A 1/1999 Martinez, Jr. et al.
6,009,488 A 12/1999 Kavipurapu
6,067,611 A 5/2000 Carpenter et al.
6,085,276 A * 7/2000 VanDoren et al. ............ 710/240
6,092,155 A 7/2000 Olnowich
6,189,043 B1 2/2001 Buyukkoc et al.
6,263,409 B1 7/2001 Haupt et al.
6,275,905 B1 8/2001 Keller et al.

(Continued)

FOREIGN PATENT DOCUMENTS

EP 1582983 5/2005

(Continued)

OTHER PUBLICATIONS

Rajwar, R. et al., "Improving the throughput of synchronization by insertion of delays," High-performance Computer Architecture, IEEE Computer SOC, pp. 168-179 (Jan. 8, 2000).

(Continued)

*Primary Examiner* — Aaron Strange
*Assistant Examiner* — Bradford F Fritz
(74) *Attorney, Agent, or Firm* — Blakely, Sokoloff, Taylor & Zafman LLP

(57) ABSTRACT

A conflict resolution technique provides consistency such that all conflicts can be detected by at least one of the conflicting requestors if each node monitors all requests after that node has made its own request. If a line is in the Exclusive, Modified or Forward state, conflicts are resolved at the node holding the unique copy. The winner of the conflict resolution, and possibly the losers, report the conflict to the home node, which pairs conflict reports and issues forwarding instructions to assure that all requesting nodes eventually receive the requested data. If a requested cache line is either uncached or present only in the Shared state, the home node provides a copy of the cache node and resolves conflicts. In one embodiment, a blackout period after all responses until an acknowledgement message has been received allows all conflicting nodes to be aware of conflicts in which they are involved.

15 Claims, 27 Drawing Sheets

200
2. CONFLICT
Peer Node
DATA-I
210
1. PRIL
1.1 PRIL
2. CONFLICT
Peer Node
DATA-I
220
1.1 PRIL
1. PRIL
1. PRIL
1.1 PRIL
Peer Node
DATA-M
230
1.1 PRIL
Home Node
240

U.S. PATENT DOCUMENTS 6,275,907 B1 8/2001 Baumgartner et al.
6,338,122 B1 1/2002 Baumgartner et al.
6,341,337 B1 1/2002 Pong
6,405,289 B1 * 6/2002 Arimilli et al. ............... 711/145
6,430,657 B1 8/2002 Mittal et al.
6,442,597 B1 * 8/2002 Deshpande et al. .......... 709/214
6,457,100 B1 * 9/2002 Ignatowski et al. ........... 711/119
6,477,535 B1 11/2002 Mirzadeh
6,478,498 B1 11/2002 Miyasaka et al.
6,484,220 B1 11/2002 Alvarez, II et al.
6,493,809 B1 12/2002 Safranek et al.
6,578,116 B2 6/2003 Bachand et al.
6,594,733 B1 * 7/2003 Cardente ....................... 711/145
6,631,447 B1 10/2003 Morioka et al.
6,631,449 B1 10/2003 Borril
6,636,944 B1 10/2003 Gilbert et al.
6,640,287 B2 10/2003 Gharachorloo et al.
6,691,192 B2 2/2004 Ajanovic et al.
6,728,841 B2 4/2004 Keller
6,760,728 B1 7/2004 Osborn
6,769,017 B1 7/2004 Bhat et al.
6,795,900 B1 9/2004 Miller et al.
6,826,591 B2 11/2004 French et al.
6,874,053 B2 3/2005 Yasuda et al.
6,877,026 B2 4/2005 Smith et al.
6,877,030 B2 4/2005 Deneroff
6,901,485 B2 5/2005 Arimilli et al.
6,922,755 B1 7/2005 Safranek et al.
6,926,591 B2 8/2005 Horsky et al.
6,934,814 B2 8/2005 Glasco et al.
6,941,440 B2 9/2005 Moll et al.
6,944,719 B2 9/2005 Rowlands et al.
6,954,829 B2 10/2005 Hum et al.
6,968,425 B2 11/2005 Hashimoto
7,062,541 B1 6/2006 Cannon et al.
7,111,128 B2 9/2006 Hum et al.
7,130,969 B2 10/2006 Hum et al.
7,209,976 B2 4/2007 Folkes et al.
7,269,698 B2 9/2007 Hum et al.
7,360,033 B2 4/2008 Hum et al.
2002/0087804 A1 7/2002 Khare et al.
2002/0087809 A1 7/2002 Arimilli et al.
2002/0129211 A1 9/2002 Arimilli et al.
2002/0178210 A1 * 11/2002 Khare et al. .................. 709/107
2003/0074430 A1 4/2003 Gieseke et al.
2003/0097529 A1 5/2003 Arimilli et al.
2004/0068620 A1 4/2004 Van Doren et al.
2004/0123045 A1 6/2004 Hum et al.
2004/0123052 A1 6/2004 Beers et al.
2005/0160231 A1 7/2005 Van Doren et al.
2005/0198440 A1 9/2005 Van Doren et al.

FOREIGN PATENT DOCUMENTS

EP 1443404 3/2007

OTHER PUBLICATIONS

Ender, Bilir E. et al., "Multicast Snooping: A New Coherence Method Using a Multicast Address Network," Computer Architecture News, pp. 294-304, (May 1999).
Azimi, M., et al., "Scalability port: a coherent interface for shared memory multiprocessors," High Performance Interconnects, IEEE , pp. 65-70 (Aug. 21, 2002).
Lilja, DJ, "Cache Coherence in Large-Scale Shared-Memory Multiprocessors: Issues and Comparisons," ACM Computing Surveys, pp. 303-338 (Sep. 2003).
PCT Search Report: PCT/US 03/37782, Jan. 9, 2006.
Jim Handy, "The Cache Memory Book," Second Edition, 1998, pp. vii-229, Academic Press Limited, London, United Kingdom.
"IEEE Standard for Scalable Coherent Interface (SCI)," IEEE Std 1596-1992, 1992, pp. i-243, Institute of Electrical and Electronics Engineers, Inc., USA.
"UltraSPARC User's Manual, UltraSPARC-I UltraSPARC-II," Jul. 1997, pp. iii-394, Sun Microsystems, USA.
*The Authoritative Dictionary of IEEE Standard Terms 7th Edition*, The Institute of Electrical and Electronics Engineers, Inc., pp. 217, 574, and 882, 2000.
*Wikipedia*, "Dynamic Random Access Memory," Revision as of Mar. 31, 2003, http://en.wikipedia.org/wiki/Dynamic_access_memory.
Office Action from U.S. Appl. No. 11/447,384 mailed Aug. 22, 2006, 8 pgs.
Tendler, et al., Tendler et al., POWER4 System Microarchecture Technical White Paper, IBM Server Group, Oct. 2001, pp. 1-6.
"Final Office Action from U.S. Appl. No. 10/833,965 mailed May 31, 2007, 22 pgs."
Office Action from U.S. Appl. No. 10/833,965 mailed Sep. 21, 2007, 14 pgs.
Office Action from U.S. Appl. No. 10/833,977 mailed Oct. 9, 2007, 8 pgs.
Office Action from U.S. Appl. No. 10/833,963 mailed Dec. 17, 2007.
Notice of Allowance for U.S. Appl. No. 11/069,848 mailed May 8, 2007, Whole Document.
Notice of Allowance for U.S. Appl. No. 11/447,384 mailed Nov. 28, 2007, Whole Document.
Notice of Allowance for U.S. Appl. No. 11/482,673 mailed Apr. 8, 2008, Whole Document.
Notice of Allowance for U.S. Appl. No. 10/833,963 mailed Jul. 10, 2008, Whole Document.
Combined Search and Examination Report for GB Patent Application No. GB0802718.7 mailed Jun. 30, 2008, Whole Document.
Office Action from U.S. Appl. No. 10/833,963 mailed Oct. 6, 2008, Whole Document.
"42P13923DE OA Mailed Sep. 3, 2007 from German Patent Application 10 393 919.9-53", Whole Document.
"42P13923JP OA Mailed Jun. 6, 2008 for JP Patent Application 2004-565115", Whole Document.
"42P13923KR OA with Engligh Translation, Mailed Aug. 14, 2006 for KR Patent Application 10-2004-7011395", Whole Document.
Final Office Action from U.S. Appl. No. 10/833,965 mailed Mar. 19, 2009, 16 pgs.
Final Office Action from U.S. Appl. No. 10/833,977 mailed Jun. 23, 2009, 11 pgs.
Office Action from U.S. Appl. No. 10/833,963 mailed Aug. 5, 2009, 22 pgs.
Office Action for German Patent Application No. 10393919.9-53 Dated Mar. 27, 2009, 3 pages.
Notice of Preliminary Rejection for Korean Patent Application No. 10-2006-7022561 Mailed Nov. 21, 2007, 4 pages.
Notice of Preliminary Rejection from Korean Patent Application No. 10-2006-7022561 Mailed May 20, 2008, 2 pages.
"European Search Report for EP Patent App No EP03257787 (42P13986D) Mailed February 23, 2007", 35 Pages.
"Office Action German Patent Application No. 11 2005 000 974.2-53 Dated Apr. 2, 2009", 4 pages.
Lenoski, Daniel , et al., "The Directory-Based Cache Coherence Protocol for the DASH Multiprocessor", *Computer Architecture, 1990 Proceedings*. 17th Annual International, May 28-31, 1990., pp. 148-159.
Santori, Gabriele , "Hypertransport Technology", "HyperTransport Technology Overview & Consortium Annoucement," Platform Conference, Jul. 24-25, 2001., Platform Conference, 19 pages.
Santori, Gabriele , "Hypertransport Technology", "*HyperTransport Technology*", Platform Conference, Jul. 24-25, 2001., 10 pages.
Ahmed, Hamdy S., "P15925 Office Action", (Dec. 26, 2006), 12 pages.
Cen, Ling , "PCT/US2005/012087 Internatinal Preliminary Report", (Nov. 9, 2006), 12 pages.
Cen, Ling , "PCT/US2005/012087 Search Report", (Oct. 28, 2005), 18 pages.
Santori, Gabriele , "Hypertransport Technology", *President Hypertransport Technology Consortium, Alter*, Platform Conference,19 pages.
Santori, Gabriele , "Hypertransport Technology", *President Hypertransport Technology Consortium, Alter*, 10 pages.

* cited by examiner

700
PROCESSOR
710
CACHE MEMORY
720
ALT. NODE LINKS 755
MEMORY CONTROLLER
730
NODE LINKS 750
MEMORY
740

SPECULATIVE DISTRIBUTED CONFLICT RESOLUTION FOR A CACHE COHERENCY PROTOCOL

RELATED APPLICATIONS

The present U.S. Patent application is related to the following U.S. Patent applications filed concurrently:

(1) application Ser. No. 10/325,069, filed Dec. 19, 2002, entitled "FORWARD STATE FOR USE IN CACHE COHERENCY IN A MULTI-NODE SYSTEM", U.S. Pat. No. 6,922,756 issued Jul. 26, 2005

(2) application Ser. No. 10/326,234, filed Dec. 19, 2002, entitled "HIERARCHICAL DIRECTORIES FOR CACHE COHERENCY IN A MULTIPROCESSOR SYSTEM"

(3) application Ser. No. 10/324,711, filed Dec. 19, 2002, entitled "HIERARCHICAL VIRTUAL MODEL OF A CACHE HIERARCHY IN A MULTIPROCESSOR SYSTEM"

(4) application Ser. No. 10/326,232, filed Dec. 19, 2002, entitled "NON-SPECULATIVE DISTRIBUTED CONFLICT RESOLUTION FOR A CACHE COHERENCY PROTOCOL", U.S. Pat. No. 6,954,829 issued Oct. 11, 2005

FIELD

The invention relates to cache memories. More particularly, the invention relates to distributed conflict resolution in a multi-cache multiprocessor system.

BACKGROUND

When an electronic system includes multiple cache memories, the validity of the data available for use must be maintained. This is typically accomplished by manipulating data according to a cache coherency protocol. As the number of caches and/or processors increases, the complexity of maintaining cache coherency also increases.

When multiple components (e.g., a cache memory, a processor) request the same block of data the conflict between the multiple components must be resolved in a manner that maintains the validity of the data. Current cache coherency protocols typically have a single component that is responsible for conflict resolution. However, as the complexity of the system increases, reliance on a single component for conflict resolution can decrease overall system performance.

FIGS. 1*a* through 1*e* provide a conceptual illustration of a conflict condition in a multi-node system. Nodes 110, 120 and 130 are peer nodes that can store a copy of the requested data (e.g., a cache line) in cache memory. Home node 140 is the Home (H) node for the requested data. In the example of FIGS. 1*a* through 1*e*, peer nodes 110 and 120 store an invalid copy, or no copy, of the requested data and peer node 130 stores a modified copy of the requested data that has not been written back to memory. The Home node stores the original copy of the data in memory or modified versions of the data when the modifications are written back to memory.

As illustrated in FIG. 1*a*, peer node 120 transmits a Data Request message to request a copy of a block of data, for example, a cache line. The Data Request message is transmitted to peer node 110 and to peer node 130. However, the Data Request message to peer node 130 is delayed. The delay can be caused, for example, by lack of available bandwidth, buffering considerations, etc.

Peer node 110 responds to the Data Request message from peer node 120 with a No Valid Copy message, which indicates to peer node 120 that peer node 110 does not have a valid copy of the requested data. At some time after peer node 120 transmits Data Request messages, Peer node 110 transmits Data Request messages to peer nodes 120 and 130, as illustrated in FIG. 1*b*, requesting the same data as was requested by peer node 120.

Peer node 120 provides a No Valid Copy message to peer node 110 in response to the Data Request message. Peer node 130 provides the requested data to peer node 110. The copy of the data, if any, maintained by peer node 130 is marked invalid and the copy of the data stored by peer node 110 is marked Modified.

At some time after peer node 130 has responded to the Data Request from peer node 110 and invalidated the copy of the data, peer node 130 receives the delayed Data Request message from peer node 120, as illustrated in FIG. 1*c*. In response to the Data Request message, peer node 130 provides a No Valid Copy message to peer node 120. Note that the state of the data stored by peer node 130 changed from the time of the original Data Request message to the time the peer node 130 responds to the Data Request message.

Because peer nodes 110 and 130 respond to the Data Request message from peer node 120 with No Valid Copy messages, peer node 120, finding no valid cached copy of the requested data, requests a copy of the data from home node 140. Thus, as illustrated in FIG. 1*d*, peer node transmits a Read message to home node 140. Home node 140 retrieves the requested data from memory and provides the data to peer node 120. Peer node 120 then stores the requested data in the Exclusive state.

As illustrated in FIG. 1*e*, the sequence of messages illustrated in FIGS. 1*a* through 1*e* result in two incompatible copies of a data line. In the example provided peer node 110 stores a copy of the data in the Modified state and peer node 120 stores a copy of the data in the Exclusive state. However, the copy stored by peer node 120 is not exclusive to peer node 120. Thus, multi-node systems can result in incompatible copies of data under certain circumstances unless a mechanism is provided to resolve cache conflicts.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Figure 1A:
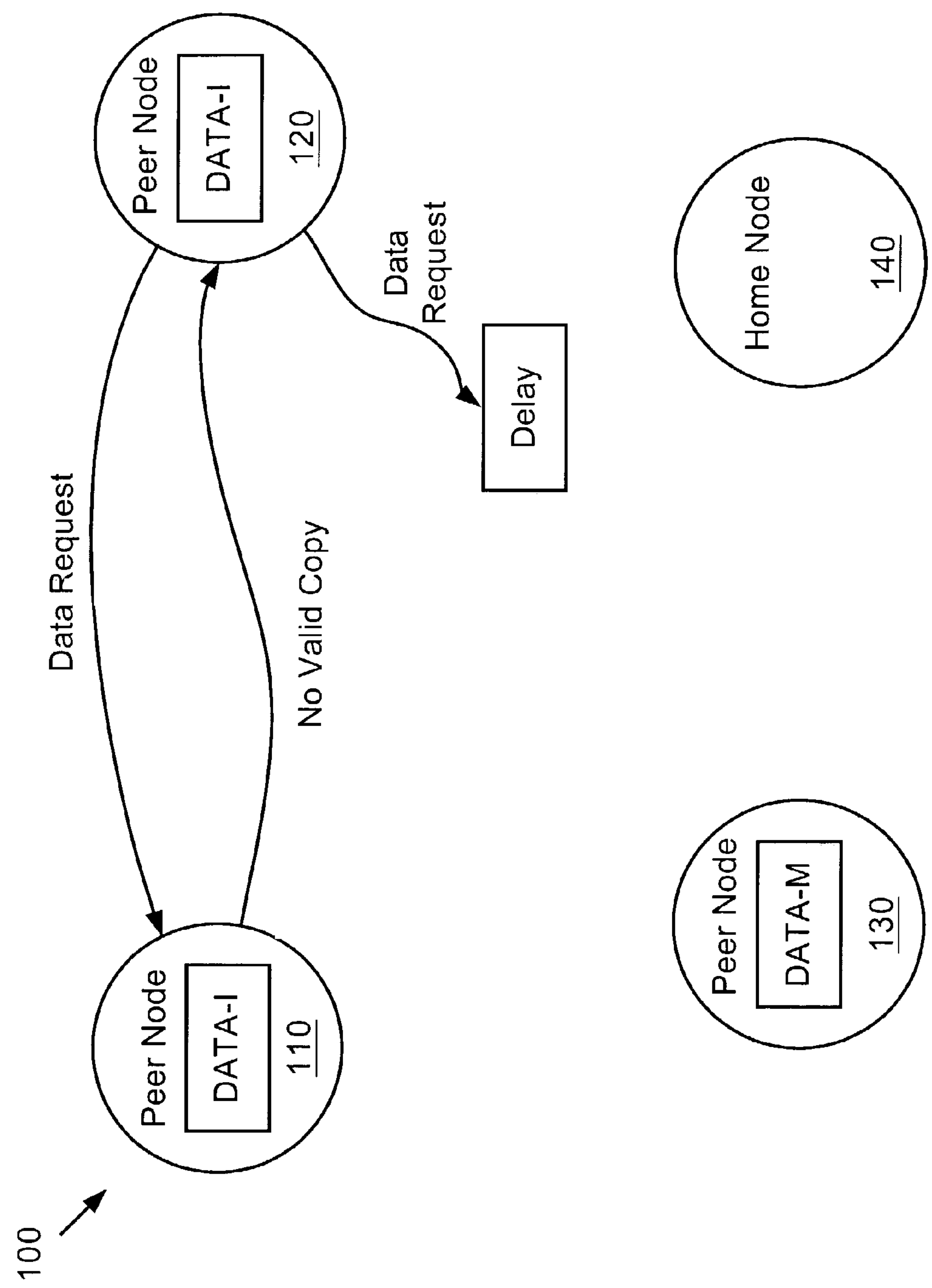
FIGS. 1*a* through 1*e* provide a conceptual illustration of a conflict condition in a multi-node system.
Figure 1B:
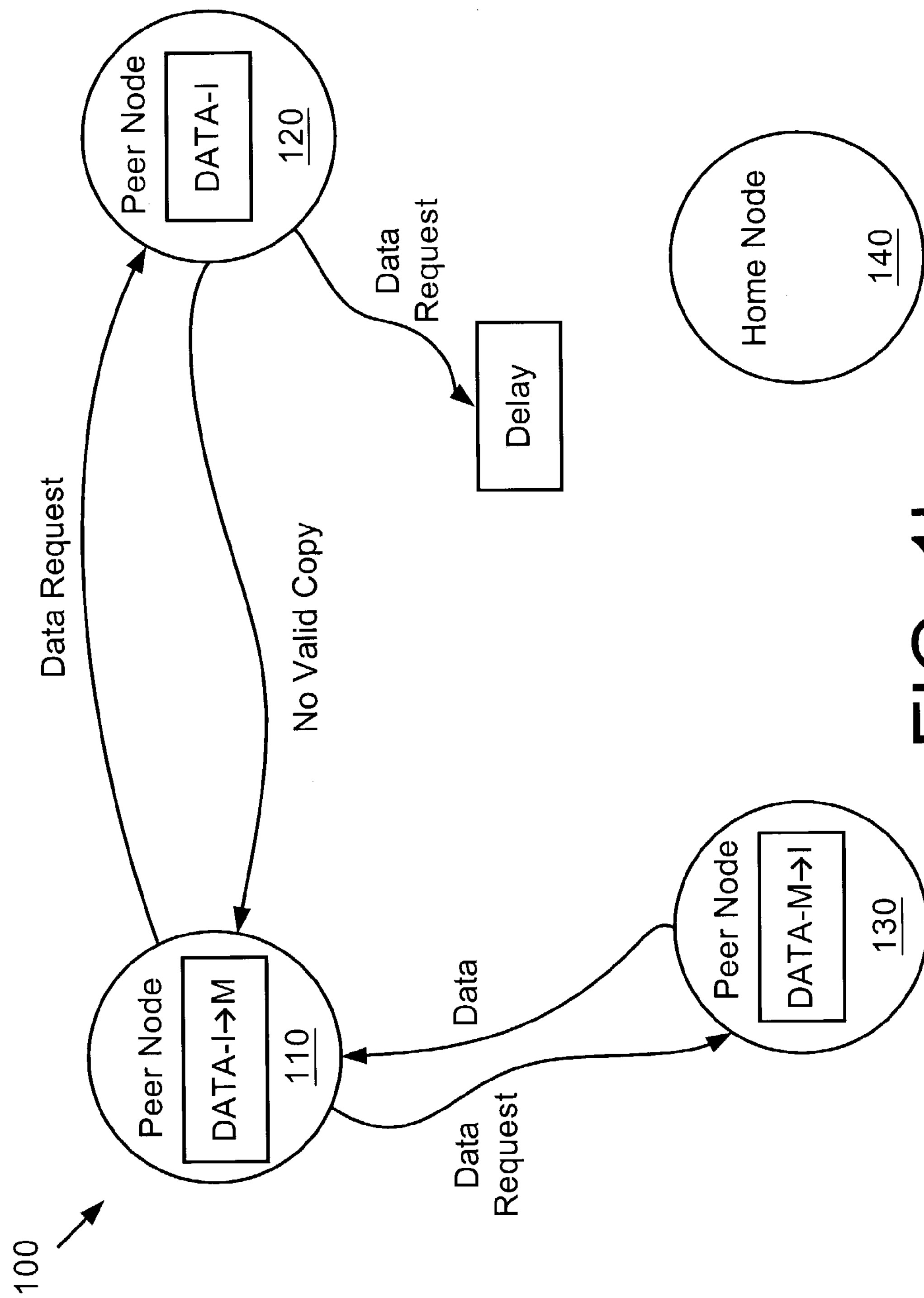
Figure 1C:
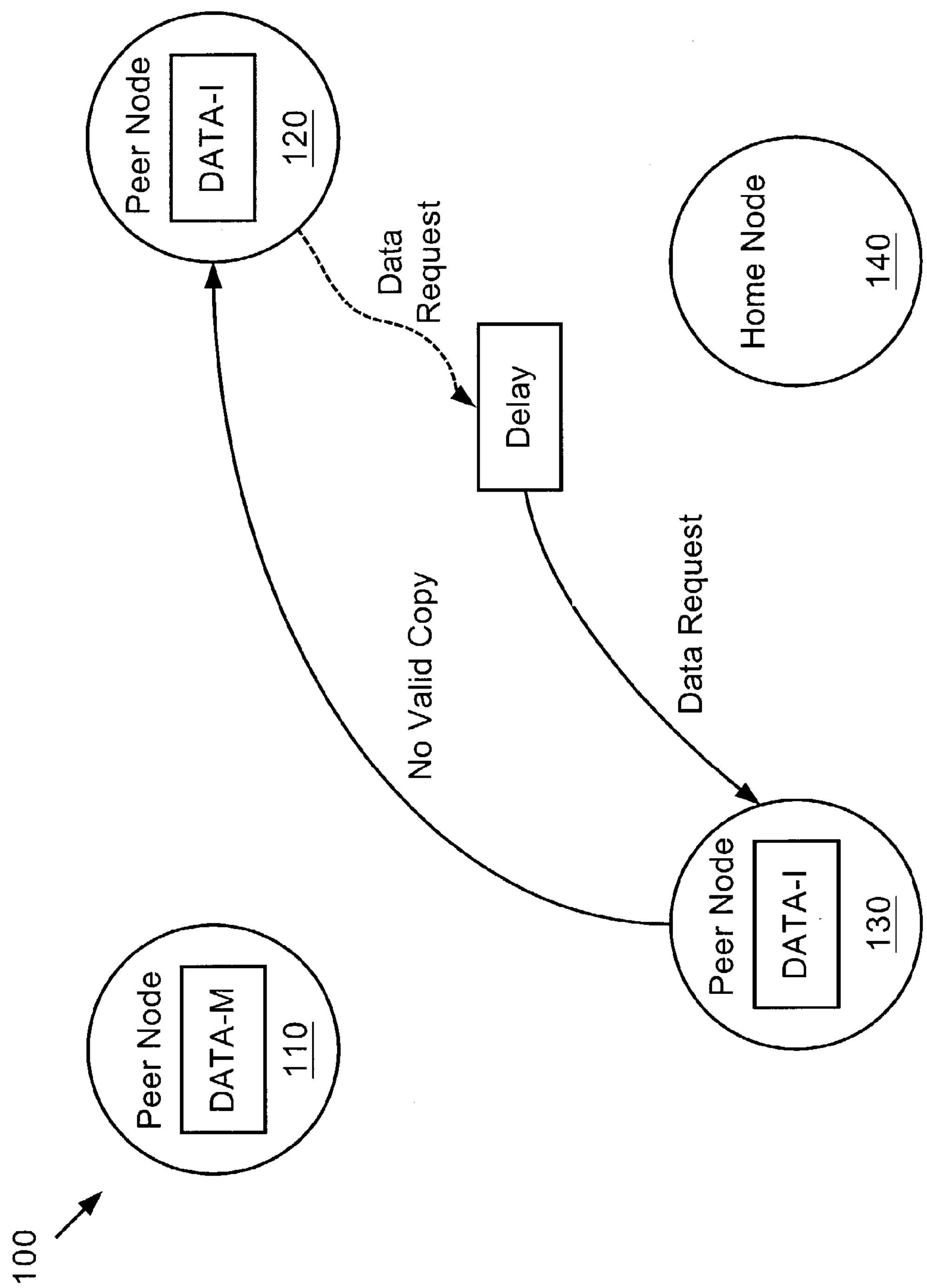
Figure 1D:
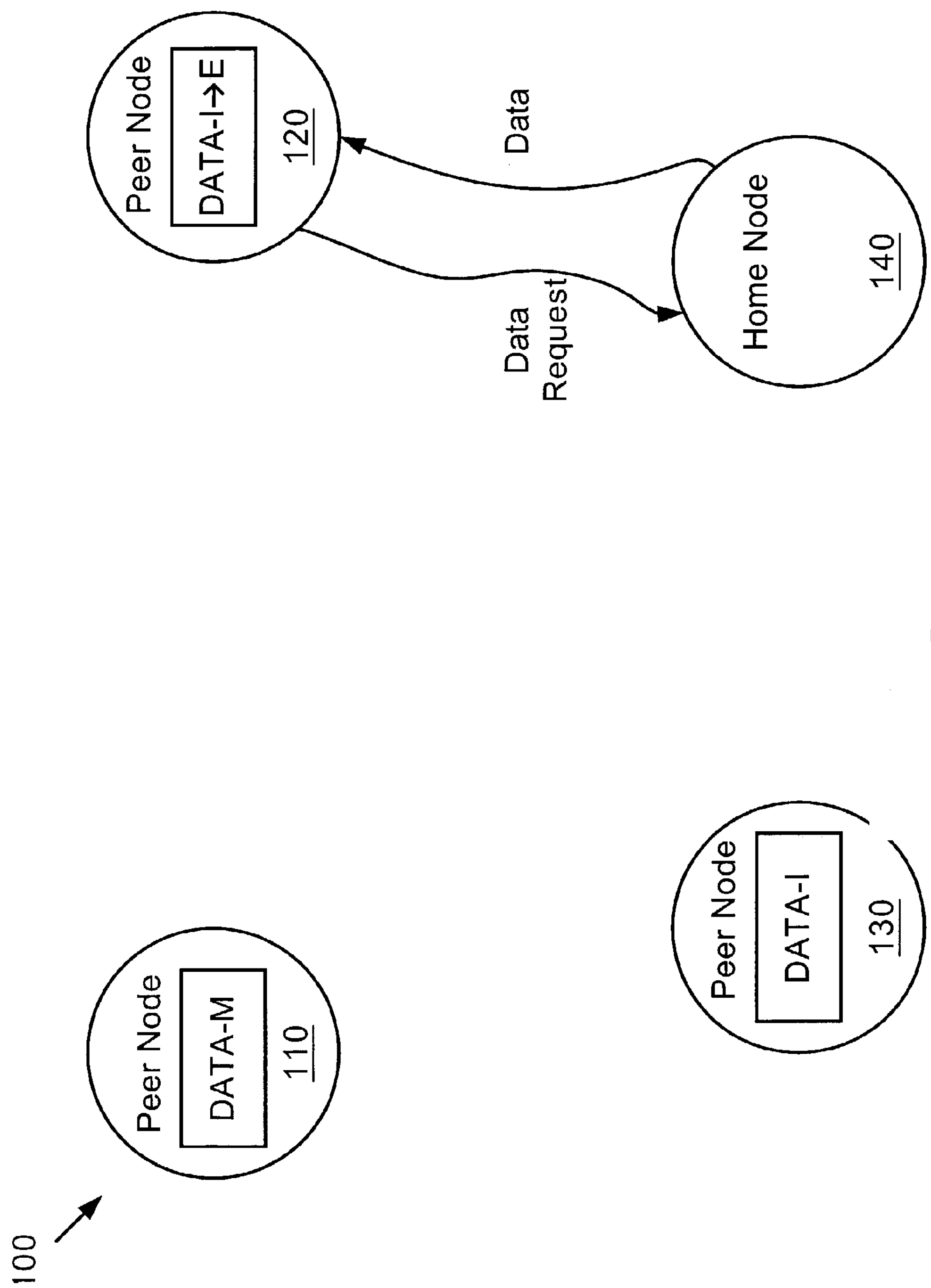
Figure 1E:
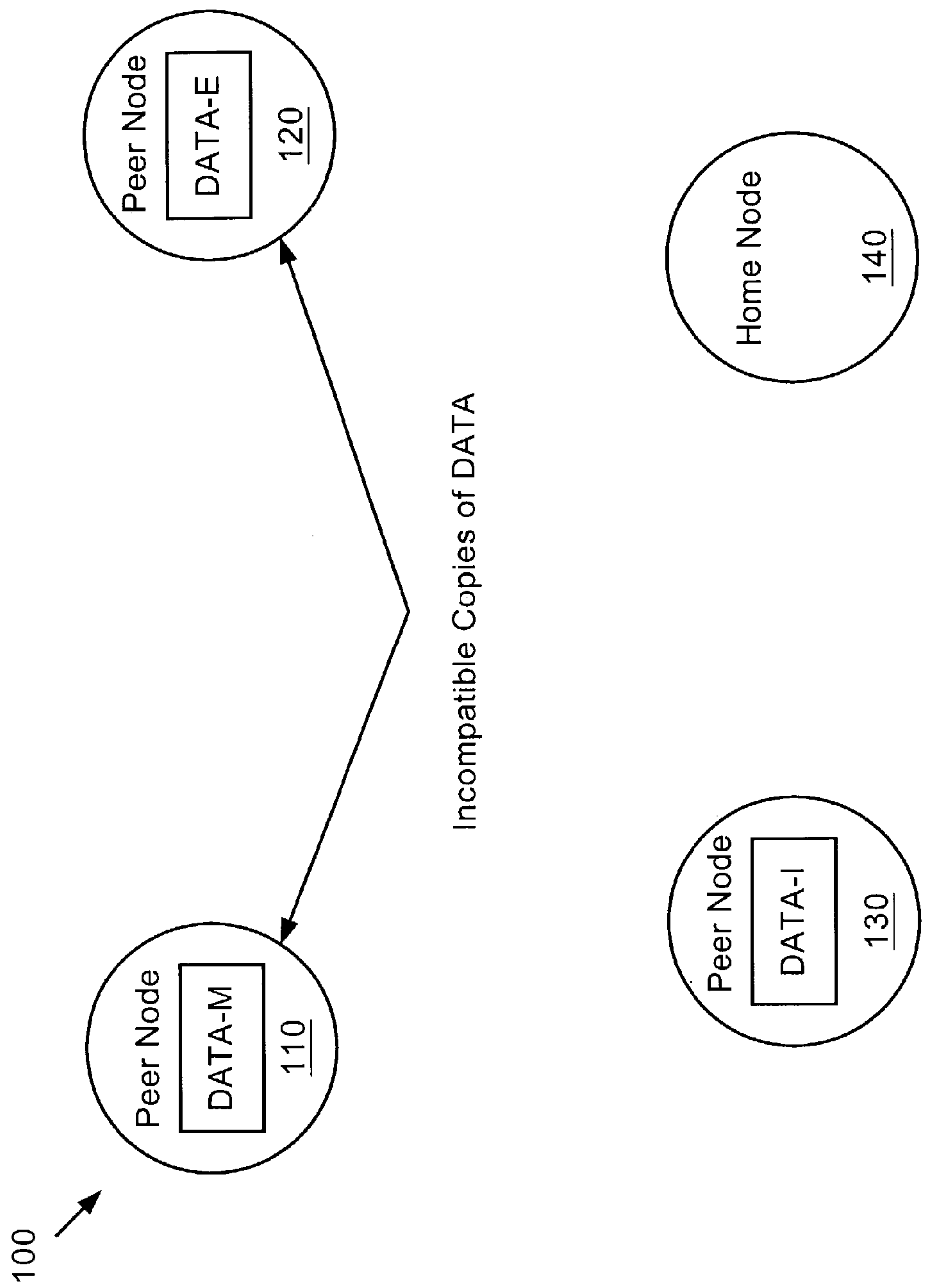

Techniques for distributed cache coherency conflict resolution in a multi-node system are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Request Messages

The following messages are requests for data/action from a requesting node. These messages are broadcast to all nodes of the system.

Port Read Line (PRL): This is a request for a copy of a data segment such as, for example, a cache line.

Port Read Invalidate Line (PRIL): This is a request for a copy of a data segment where the provider node's copy of the data is invalidated. This message can also be referred to as a "request for ownership."

Port Write Line (PWL): This message causes data (e.g., a modified cache line) to be written to memory. This message can also referred to as a "dirty eviction."

Port Invalidate Line (PIL): This message causes the state of designated data to change from Shared to Exclusive.

Port Write Invalidate Line (PWIL): This message causes data to be written to memory and the target copy of the data to be invalidated.

Response Messages

The following messages are messages from sent from Peer (i.e., Non-Home) nodes to the Requesting node in response to requests described above.

Invalid State Acknowledgement (IACK): This message is a response to a request (PRL, PRIL, PWL, PIL, PWIL) when the node sending the response has an invalid copy of the requested data or no copy of the requested data.

Shared State Acknowledgement (SACK): This message is a response to a request when the node sending the response has a copy of the requested data in the Shared state.

Acknowledgement of Data Received (DACK): This message is sent by a requesting node to the node from which the requesting node received data. It is sent after the requesting node has sent a READ or CNCL message to the home node and received a XFR/XFRI message or ACK message from the home node.

Conflict: This message indicates that there is a copending request for the requested cache line.

Messages to Home Node

These messages are transmitted to the Home node by a Peer node.

Read(Conflicts): This message requests data from the Home nodes and lists conflicts, if any. This message is sent after all responses are received by a peer node if none of the received messages were a DATA message.

CNCL(Conflicts): This message is sent to the Home node in response to a hit in a Peer node and lists conflicts, if any. This message cancels the Home node's prefetch operation. This message is sent after all responses are received by a peer node and one of them was a DATA message.

Data: This message is used to write back data for PWL and PWIL requests.

Messages From the Home Node

These messages are sent from the Home node to the Peer and/or Requesting nodes.

Data: This message includes the requested data and can indicate the state of the data (M/E/F/S) to be used by the Requesting node.

Transfer (XFR): This message causes the receiving node to transfer data to the node indicated in the message. The home node sends this message to the current owner of requested data when the home node is informed of a conflict condition requiring that the current owner of the data transfer the data to the target node. A XFRI message is sent instead of a XFR message if the home node determines that an unresolved conflicting request is a PRIL message, meaning that the current owner must invalidate the line when initiating the data transfer. In one embodiment, the first node in an epoch to send a CNCL message is the current owner. An epoch is the period between a first request for data and the resolution of all requests for the data. If the home node sends data to a node from memory, that node is the current owner. Sending a XFR/XFRI message causes the target node to become the current owner. In one embodiment, the target node is selected from a list of conflicts provided to the home node in a READ or a CNCL message.

Acknowledge (ACK): This message indicates that the requested data has been sent to the Requesting node. When the home node sends an ACK message, the current epoch is terminated.

Wait: This message causes the receiving node to pause before sending further messages.

Overview of the MESIF Protocol

There are two basic schemes for providing cache coherence, snooping (now often called Symmetric MultiProcessing SMP) and directories (often called Distributed Shared Memory DSM). The fundamental difference has to do with placement and access to the meta-information, that is, the information about where copies of a cache line are stored.

For snooping caches the information is distributed with the cached copies themselves, that is, each valid copy of a cache line is held by a unit that must recognize its responsibility whenever any node requests permission to access the cache line in a new way. Someplace—usually at a fixed location—is a repository where the data is stored when it is uncached. This location may contain a valid copy even when the line is cached. However, the location of this node is generally unknown to requesting nodes—the requesting nodes simply broadcast the address of a requested cache line, along with permissions needed, and all nodes that might have a copy must respond to assure that consistency is maintained, with the node containing the uncached copy responding if no other (peer) node responds.

For directory-based schemes, in addition to a fixed place where the uncached data is stored, there is a fixed location, the directory, indicating where cached copies reside. In order to access a cache line in a new way, a node must communicate with the node containing the directory, which is usually the same node containing the uncached data repository, thus allowing the responding node to provide the data when the main storage copy is valid. Such a node is referred to as the Home node.

The directory may be distributed in two ways. First, main storage data (the uncached repository) is often distributed among nodes, with the directory distributed in the same way. Secondly, the meta-information itself may be distributed, keeping at the Home node as little information as whether the line is cached, and if so, where a single copy resides. SCI, for example, uses this scheme, with each node that contains a cached copy maintaining links to other nodes with cached copies, thus collectively maintaining a complete directory.

Snooping schemes rely on broadcast, because there is no single place where the meta-information is held, so all nodes must be notified of each query, each node being responsible for doing its part to assure that coherence is maintained. This includes intervention messages, informing the Home node not to respond when another node is providing the data.

Snooping schemes have the advantage that responses can be direct and quick, but do not scale well because all nodes are required to observe all queries. Directory schemes are inherently more scalable, but require more complex responses, often involving three nodes in point-to-point communications.

The basic MESIF protocol described herein provides a snooping protocol without the limitations of a single, serializing bus. Like a snooping cache protocol, MESIF relies on nodes with cached copies of data to maintain coherence. The use of point-to-point links rather than a synchronous, centralized broadcast introduces the problem of time-warp—the fact that events appear to occur in a different order from the viewpoint of different node. The MESIF protocol correctly handles time-warp, recognizing when potential errors could result and making sure that they are handled correctly. The notion of a Home node is primarily to determine where the uncached copy reside, but the Home node participates in every transaction—without being on the critical path—in order to resolve conflicts and time-warp issues. Because of the concurrent-broadcast nature of the scheme, MESIF achieves the low latency associated with snooping protocols, acquiring a cacheable copy of the data in most cases in the minimum possible latency: a single roundtrip request-response.

The basic MESIF protocol involves broadcasting an initial request to all peer nodes as well as the Home node. If a copy is cached in state E, F, or M, it is included in the response. A second message is then sent to the Home node, informing it that the request has been satisfied. If the requested line is uncached, or if only S-state copies exist, the second request sent to the Home node is used to confirm the previous request, which the Home node may have by now fetched from its memory. In either case, the Home node must respond to the second request (and to the first, though they can sometimes be combined) for purposes of synchronization and conflict resolution. Note that the Home node may have one or more caches, so it may respond to the initial request just like any other node.

Conflicts are handled in a distributed way. The timewarp problem makes it difficult to detect conflicts, because individual requests can be delayed for an arbitrarily long time. A conflict will be detected, however, if each node monitors for conflicts after making a request. Both nodes may or may not detect a conflict, but at least one will. Because all nodes must respond to a broadcast request either by supplying the data or indicating they do not have a copy (or, under some circumstances, are not supplying the copy they have), the response can include an indication of a conflict, so conflicting nodes will detect the conflict.

Complications arise from allowing a node to use the data as soon as the data arrives rather than waiting for all responses. Thus, a node receiving a copy of the data is allowed to use the data internally immediately upon receipt, but may not make the effects of using the data visible to the rest of the system until the node has received a confirmation from Home. The confirmation may also include instructions that the node must forward its copy to another node, and perhaps evict the node from its own cache.

Finally, when a node responds to a request from another node by supplying the cached data, the node must defer all other requests it receives for the same cache line until the node receives a response from the Home node acknowledging the fact that the node forwarded the data, thus assuring that all nodes observe the same order of transfer of the (possibly writable) cache line.

The Home node is the respository for the uncached data, but the home node also may have a processor generating requests and include one or more caches. Like any other node, when the home nodes processor misses, the home node must broadcast requests to all other (peer) nodes, and the home node must handle the request internally as it would any other request arriving for the Home node. Note that this is a special case in that the home node does not explicitly send messages to itself (the Home node). In addition, when an external request arrives for data that is cached locally, the Home node must respond in a way to assure that a later response from the Home node is not ambiguous. That is, the home node may respond to the initial request by supplying the data, but the home node must also respond to the second request as the Home node.

A more detailed, pseudo-code-based description of various embodiments of the MESIF protocol suitable for use as described herein are attached hereto as Appendix A.

Overview of Speculative Distributed Conflict Resolution

In general, a cache coherency protocol requires conflict resolution in order to provide orderly changes of state for the various cache lines or other blocks of data. A conflict resolution technique described herein provides sequential consistency, which means that only a single, modifiable copy of a cache line can be present at any time, and that no copy of a cache line can be modified while other copies are readable. Conflicting requests to modify a copy of a cache line must, therefore, be resolved in order to maintain sequential consistency.

In one embodiment, a conflict is resolved using the property of time. That is, regardless of delays, two nodes cannot both request a cache line before the other. Thus, conflicts can be detected by at least one of the conflicting requesters if each node monitors all requests after that node has made its own request.

In one embodiment, if a line is in the Exclusive (E), Modified (M) or Forward (F) state, conflicts are resolved at the node holding the unique copy. The winner of the conflict resolution, and possibly the losers, report the conflict to the home node, which pairs conflict reports and issues forwarding instructions to assure that all requesting nodes eventually receive the requested data. In one embodiment, if a requested cache line is either uncached or present only in the Shared (S) state, the home node for the requested cache line provides a copy of the requested data and resolves conflicts.

In one embodiment, the distributed conflict resolution described herein is part of a cache protocol referred to as the MESIF protocol in which one of five states is associated with a cached copy of a cache line (Modified, Exclusive, Shared, Invalid, Forward). In one embodiment, a blackout period after all responses for a request until an acknowledgement message has been received from the home node allows all conflicting nodes to be aware of conflicts in which the nodes are involved. The blackout period does not limit use of the data in the cache, but does prevent the data from being propagated to other caches.

The discussion that follows is provided in terms of nodes within a multi-node system. In one embodiment, a node includes a processor having an internal cache memory, an external cache memory and/or an external memory. In an alternate embodiment, a node is an electronic system (e.g., computer system, mobile device) interconnected with other electronic systems. Other types of node configurations can also be used. In the examples that follow, dashed lines represent messages previously sent and solid lines represent messages being described. In order to keep the figures more clear, when a set of messages (e.g., PRIL and corresponding IACK) are resolved, the lines representing the messages are no longer included in the figures.

FIGS. 2*a* through 2*d* provide a conceptual illustration of a shared line conflict. In the example of FIGS. 2*a* through 2*d*, peer nodes 210 and 220 both request a copy of a block of data (e.g., a cache line). Peer node 230 stores the available copy of the requested block of data in the M state. The processing described also applies if peer node 230 stores the requested data in the S state or the F state.

The numbering associated with the various messages of FIGS. 2*a* through 2*d* (e.g., 1. PRIL, 7. IACK) provide approximate ordering for purposes of providing an example of a conflict. The exact timing relationships illustrated in FIGS. 2*a* through 2*d*, as well as the other examples provided (i.e., FIGS. 3*a*-3*d*, 4*a*-4*d*, 5*a*-5*d*, 6*a*-6*d*), are not required.

Figure 2A:
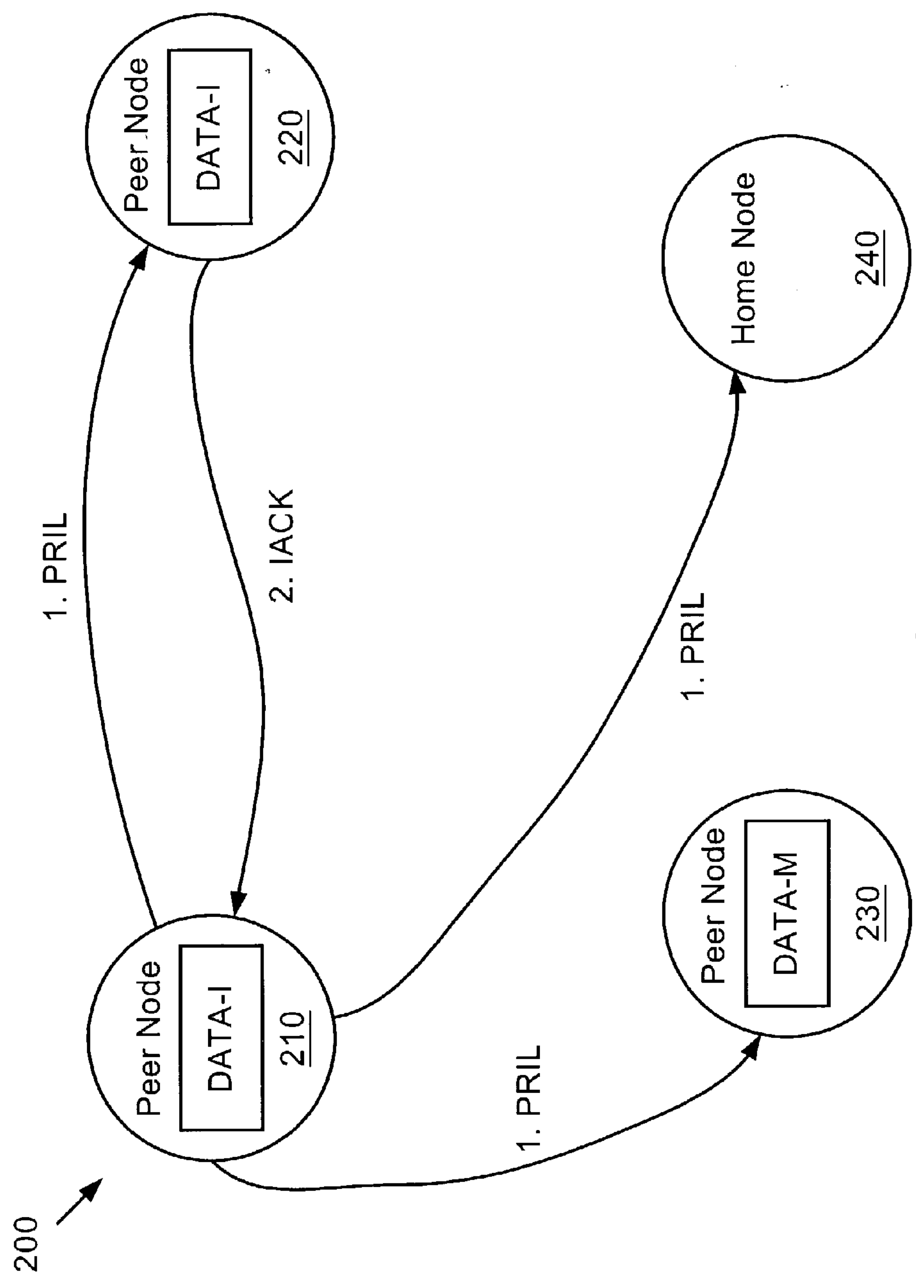
FIGS. 2*a* through 2*d* provide a conceptual illustration of a shared line conflict.

As illustrated in FIG. 2*a*, peer node 210 requests a block of data by transmitting a PRIL message to peer nodes 220 and 230 and to home node 240. Peer node 210 could also request the same block of data using a PRL message, in which case peer node 230 would not invalidate its copy in response to the request message. Peer node 220 responds to the PRIL message with an IACK message indicating that peer node 220 does not store a valid copy of the requested block of data.

Home node 240 serves as the home node for the data to be requested, which means that node 240 is associated with non-cache memory (e.g., main memory) in which the data to be requested is stored when not cached. For example, home node 240 can be a processor, cache memory and random access memory (RAM), where the RAM provides a non-cached storage location for the data.

Figure 2B:
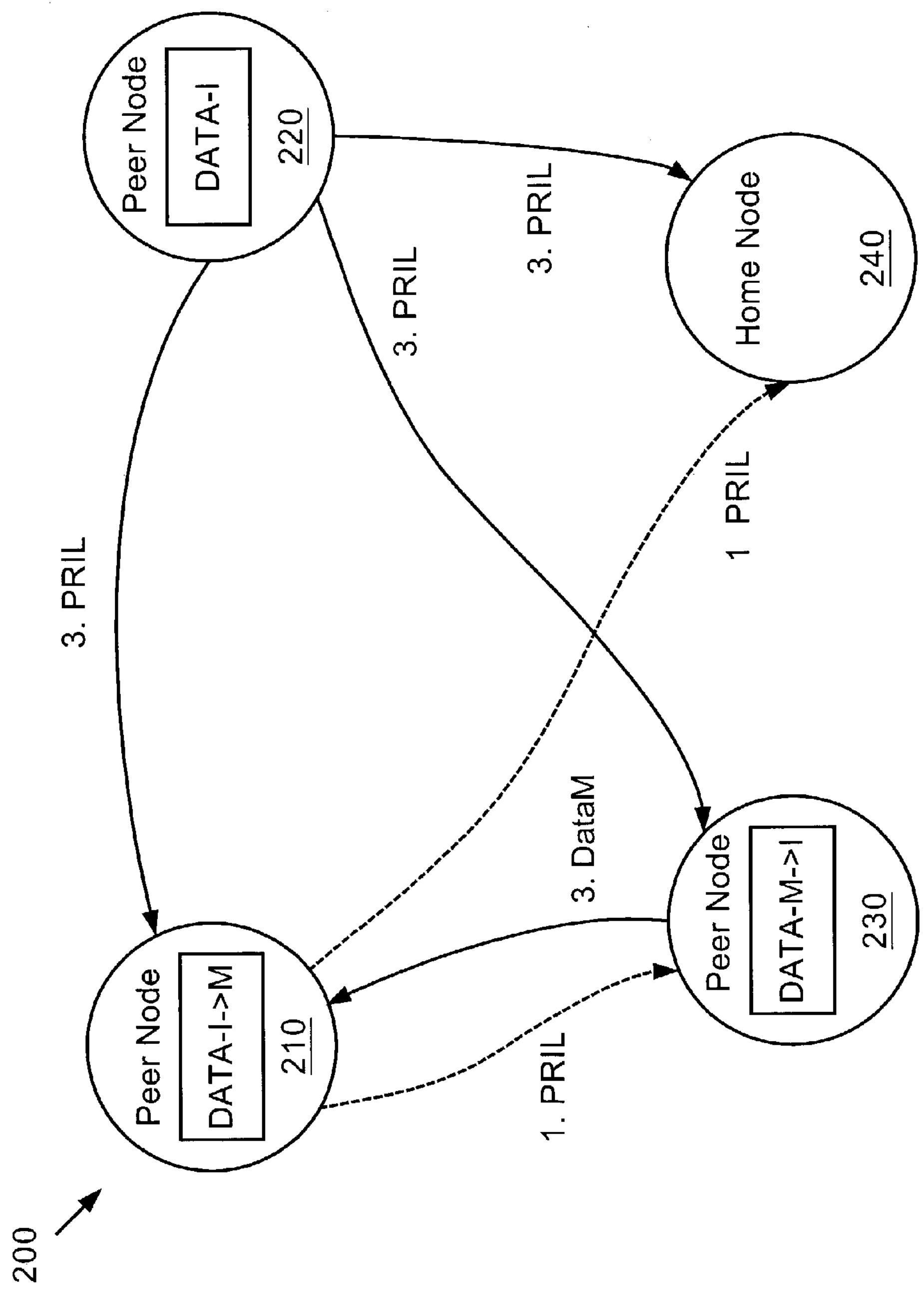

FIG. 2*b* illustrates peer node 220 transmitting a PRIL message to peer nodes 210 and 230 and to home node 240 requesting the block of data previously requested by peer node 210. As noted above, the data can also be requested using a PRL message. While the conflict of FIGS. 2*a* through 2*d* is illustrated with PRIL messages, any combination of requesting messages in which an inconsistent result can occur causes a conflict.

At approximately the same time as peer node 220 transmits the PRIL messages, peer node 230 responds to the PRIL message from peer node 210 by transmitting a DataM message to peer node 210. The DataM message provides a copy of the requested data to peer node 210 and causes peer node 210 to store the data in the Modified (M) state. Other states can be specified, for example, the Forward (F) state. The state of the copy of the requested data stored by peer node 230 is changed from the M state to the Invalid (I) state.

Figure 2C:
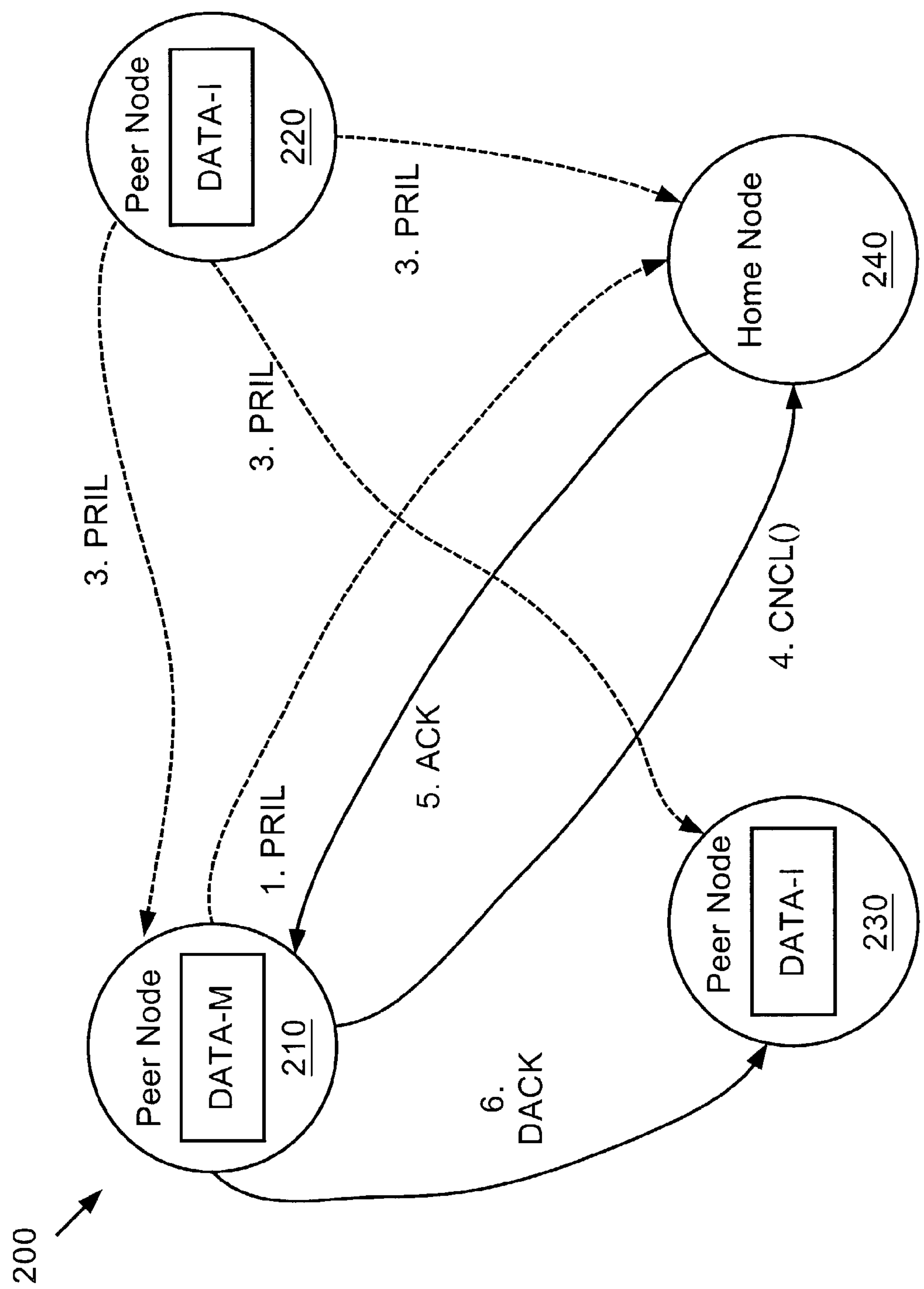

As illustrated in FIG. 2*c*, in response to receiving the DataM message from peer node 230, peer node 210 sends a CNCL( ) message to home node 240. The CNCL( ) message cancels the retrieval of the requested block of data from memory, if the retrieval has started. Home node 240 responds with an ACK message to peer node 210 that acknowledges receipt of the CNCL( ) message, which indicates the completion of processing of the PRIL message from peer node 210.

In response to receiving the ACK message from home node 240, peer node 210 transmits a DACK message to peer node 230 acknowledging receipt of the requested data from peer node 230. The period between receipt of the data from peer node 230 and transmission of the DACK message to peer node 230 is a blackout period during which the block of data is not transmitted to another node. During the blackout period peer node 210 does not respond to the PRIL message from peer node 220. Similarly, peer node 230 does not respond to the PRIL message from peer node 220 during the blackout period.

Figure 2D:
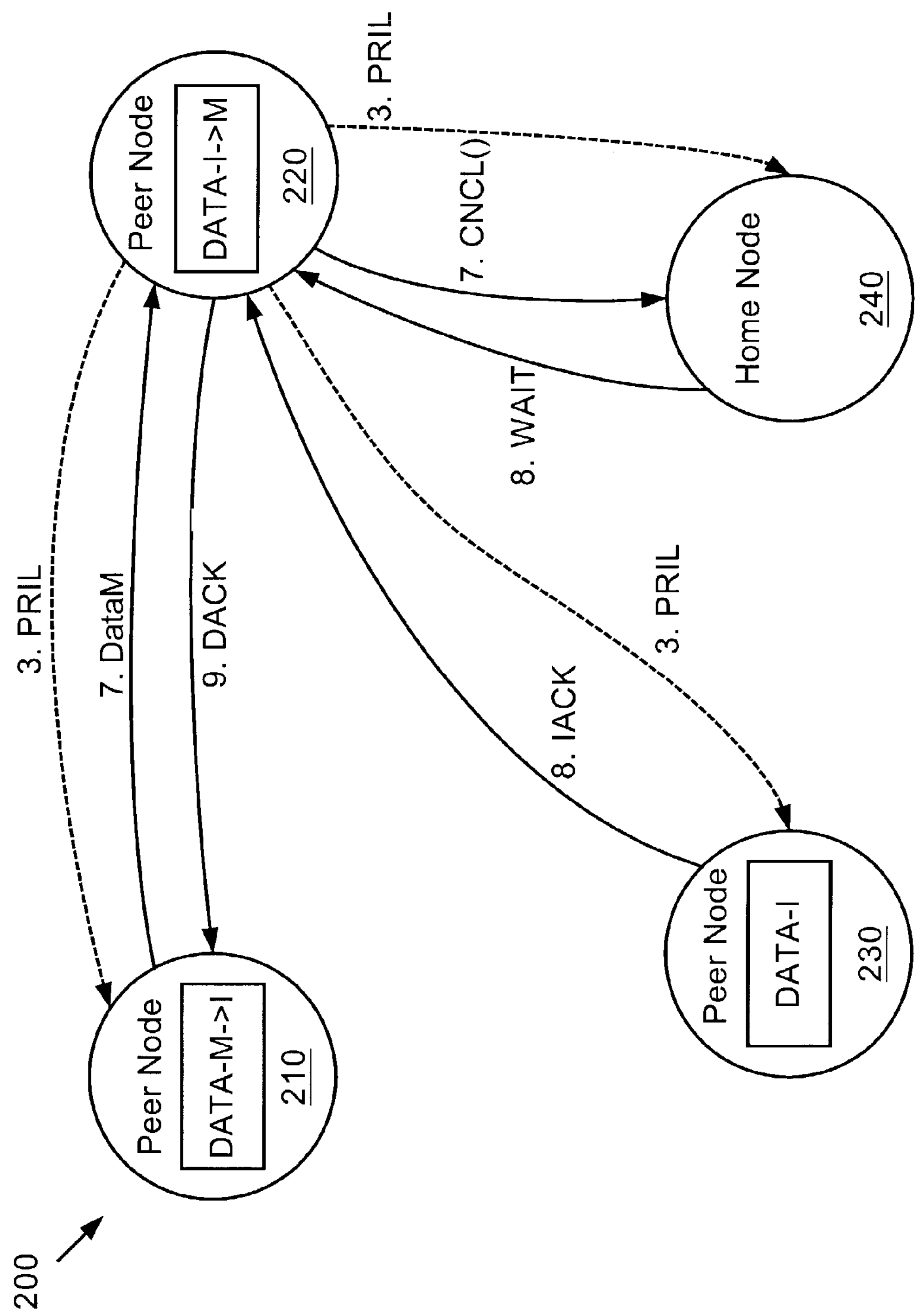

As illustrated in FIG. 2*d*, peer node 210 transmits a DataM message to peer node 220 to provide a copy of the requested data to peer node 220 and to cause peer node 220 to store the copy of the data in the M state. Other types of messages (e.g., DataF, DataS) can be used to provide the requested data to peer node 220. Peer node 210 also marks the copy of the data retained, if any, as being in the I state because the DataM message is in response to a PRIL message. The copy of the requested data retained would not be invalidated by, for example, a PRL message. Peer node 220 also sends a CNCL( ) message to home node 240 to cancel any retrieval of the requested data from non-cache memory. Home node 240 responds with a WAIT message that causes peer node 220 to pause before sending further messages.

At some time during the process described, peer node 230 and agent 290 send an IACK message to peer node 220 in response to the PRIL message requesting the block of data that is now either not stored by peer node 230 or stored in the I state. Peer node 220 responds to the DataM message from peer node 210 by transmitting a DACK message to peer node 210. The DACK message concludes the resolution of the conflicting PRIL messages from peer nodes 210 and 220.

Figure 3A:
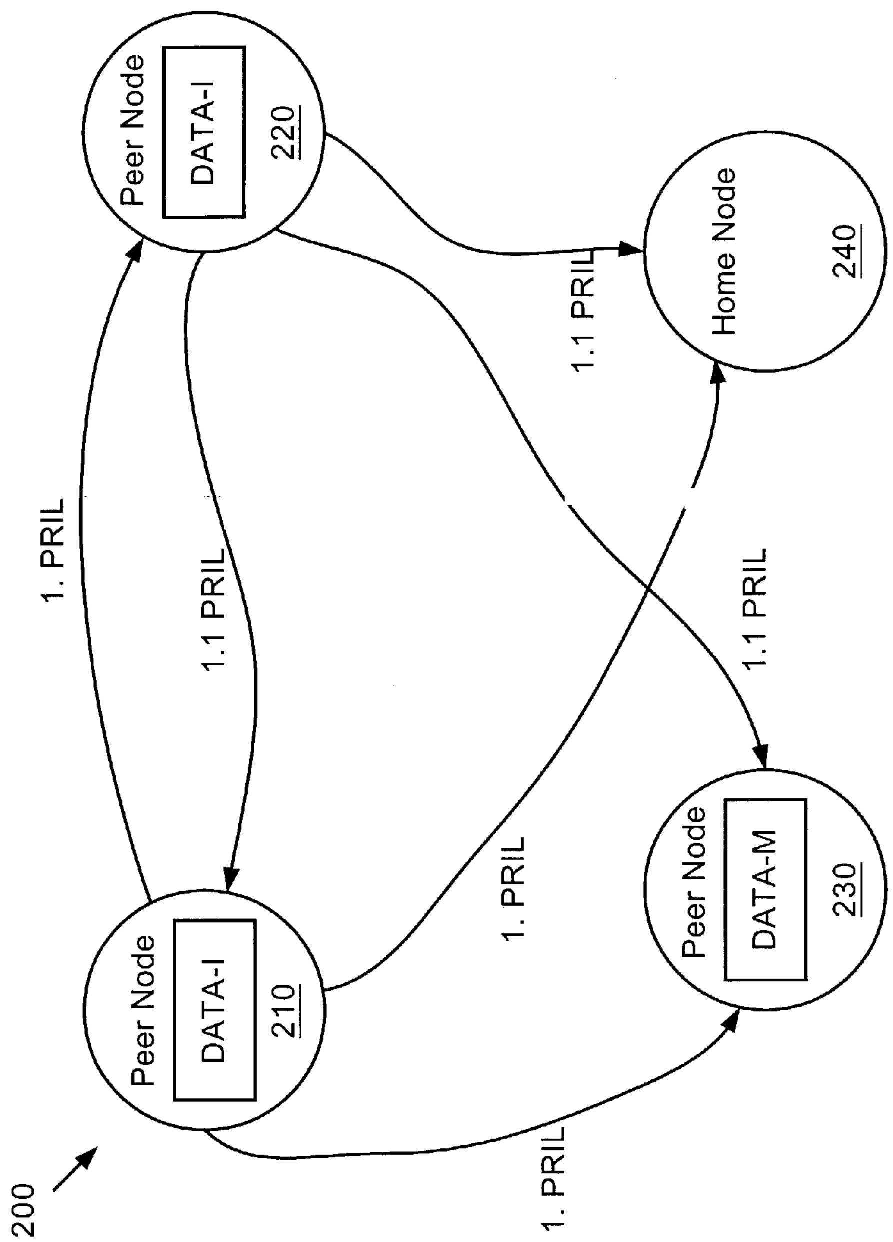
FIGS. 3*a* through 3*d* provide a conceptual illustration of a shared line conflict caused by requests issuing at approximately the same time.

FIGS. 3*a* through 3*d* provide a conceptual illustration of a shared line conflict caused by requests issuing at approximately the same time (a tie condition). As illustrated in FIG. 3*a*, Peer node 210 transmits PRIL messages requesting a block of data to peer nodes 220 and 230 and to home node 240. Some short period of time later, or even at the same time, peer node 220 sends PRIL messages to peer nodes 210 and 230 and to home nodes 240 requesting the same block of data.

Figure 3B:
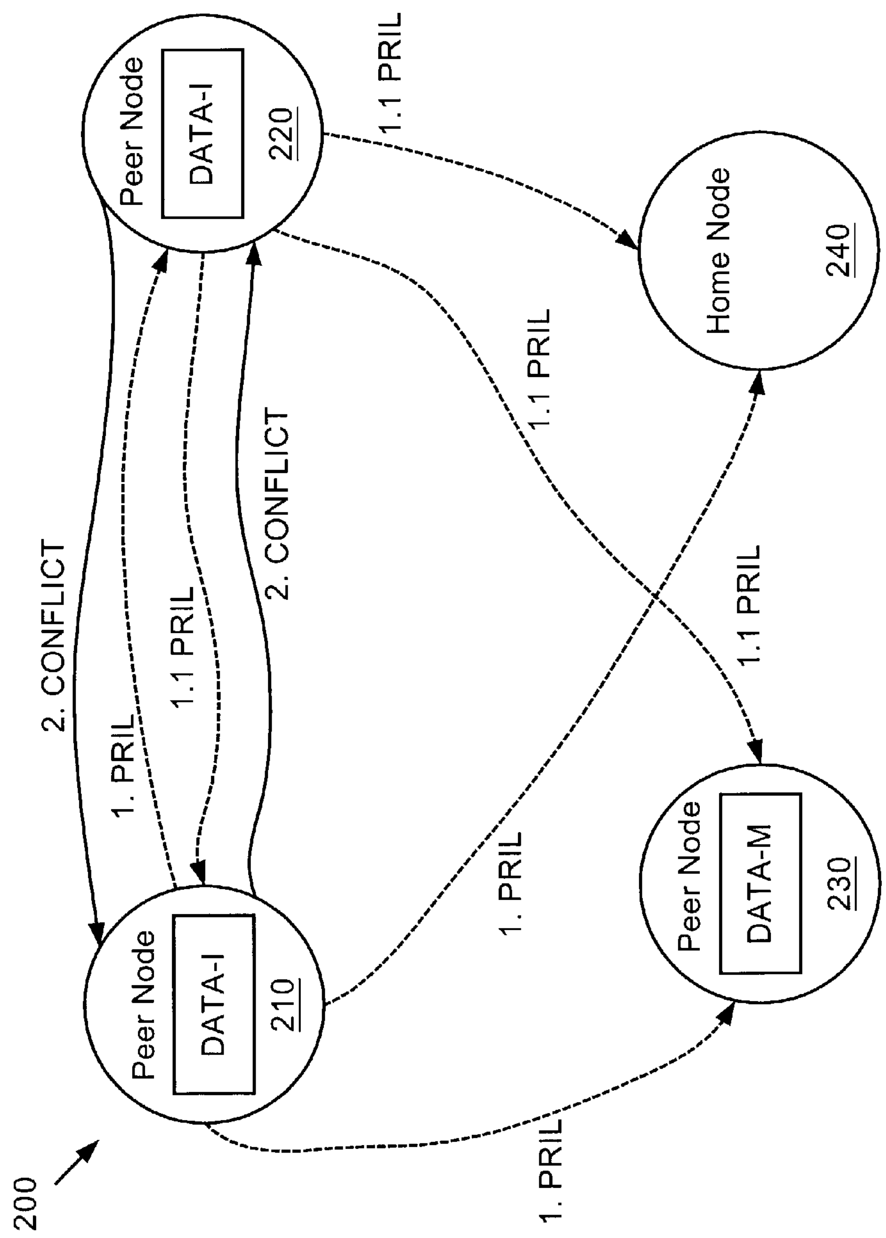

In response to receiving a PRIL message from another peer node before receiving the requested data, peer node 210 sends a CONFLICT message to peer node 220, which is the source of the conflicting PRIL message. The CONFLICT message communicates the existence of a request conflict from a peer node identifying the conflict to one or more other peer nodes involved in the conflict. Similarly, peer node 220 sends a CONFLICT message to peer node 210 in response to receiving a PRIL message before receiving the requested data. FIG. 3*b* illustrates the transmission of the CONFLICT messages between peer nodes 210 and 220.

Figure 3C:
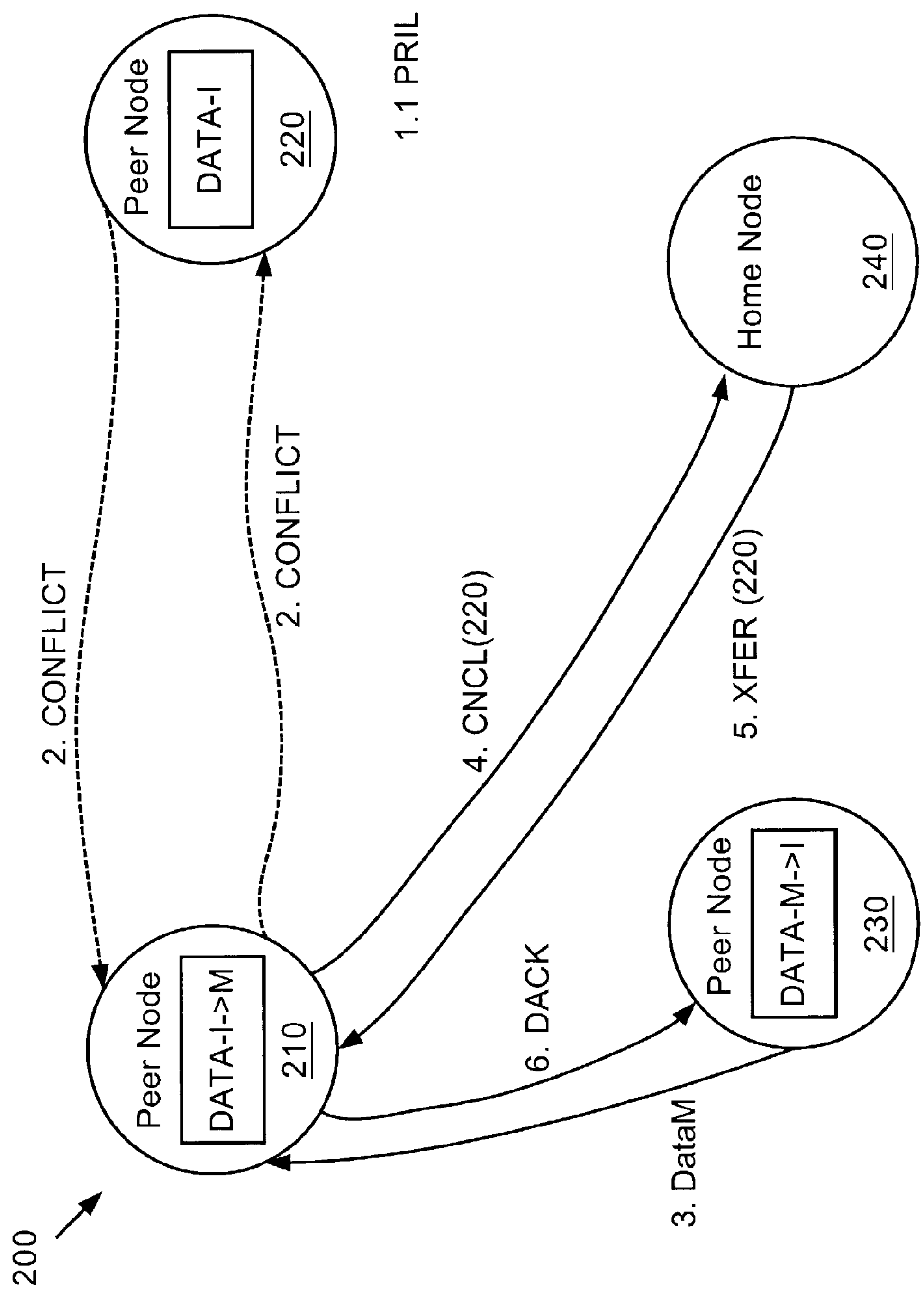

As illustrated in FIG. 3*c*, peer node 230 provides the requested data to peer node 210 in a DataM message and marks the copy of the data retained, if any, to the I state. Peer node 210 receives the requested data and stores it in the M state. Peer node 210 then sends a CNCL(220) message to home node 240. The CNCL(220) message causes home node 240 to cancel retrieval of the requested data from memory and indicates to home node 240 that a conflict exists between the sending node (i.e., peer node 210) and peer node 220.

In response to the CNCL(220) message, home node 240 sends a XFER(220) message to peer node 210. The XFER (220) message causes peer node 210 to forward a copy of the data to peer node 220. In one embodiment, peer node 210 uses and/or modifies the requested block of data before sending a copy of the data to peer node 220. In an alternate embodiment, peer node 210 sends a copy of the data to peer node 220 immediately. In response to receiving the XFER(220) message from home node 240, peer node 210 sends a DACK message to peer node 230 acknowledging receipt of the requested data.

Figure 3D:
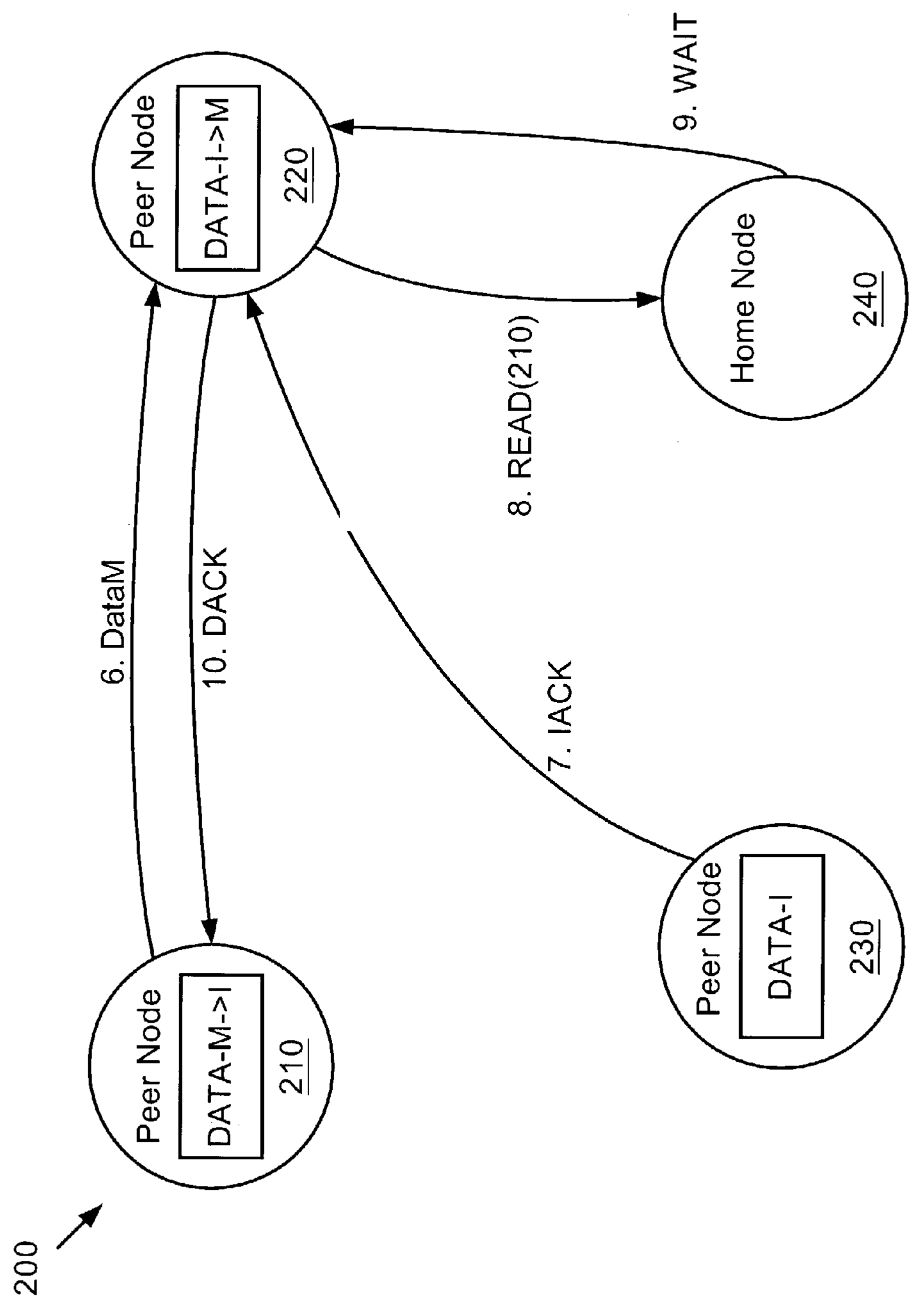

As illustrated in FIG. 3*d*, in response to receiving the DACK message from peer node 210, peer node 230 sends an IACK message to peer node 220 indicating that peer node 230 does not store a valid copy of the requested data. Peer node 230 does not respond to the second PRIL message (i.e., the PRIL message from peer node 220) until the first PRIL message (i.e., the PRIL message from peer node 210) is resolved. In response to the XFER(220) message from home node 240, peer node 210 sends a copy of the requested data to peer node 220 in a DataM message. Peer node 210 marks any copy of the data retained in the I state and peer node 220 stores the copy of the data received in the M state.

Peer node 220 sends a READ(210) message to home node 240 to halt retrieval of the requested data from memory and to indicate the peer node 220 has detected a conflict with peer node 210. Home node 240 responds to the READ(210) message with a WAIT message that is transmitted to peer node 220. The WAIT message causes peer node 220 to pause a predetermined period of time before transmitting any subsequent messages. Peer node 220 sends a DACK message to peer node 210 to indicate receipt of the requested data.

Figure 4A:
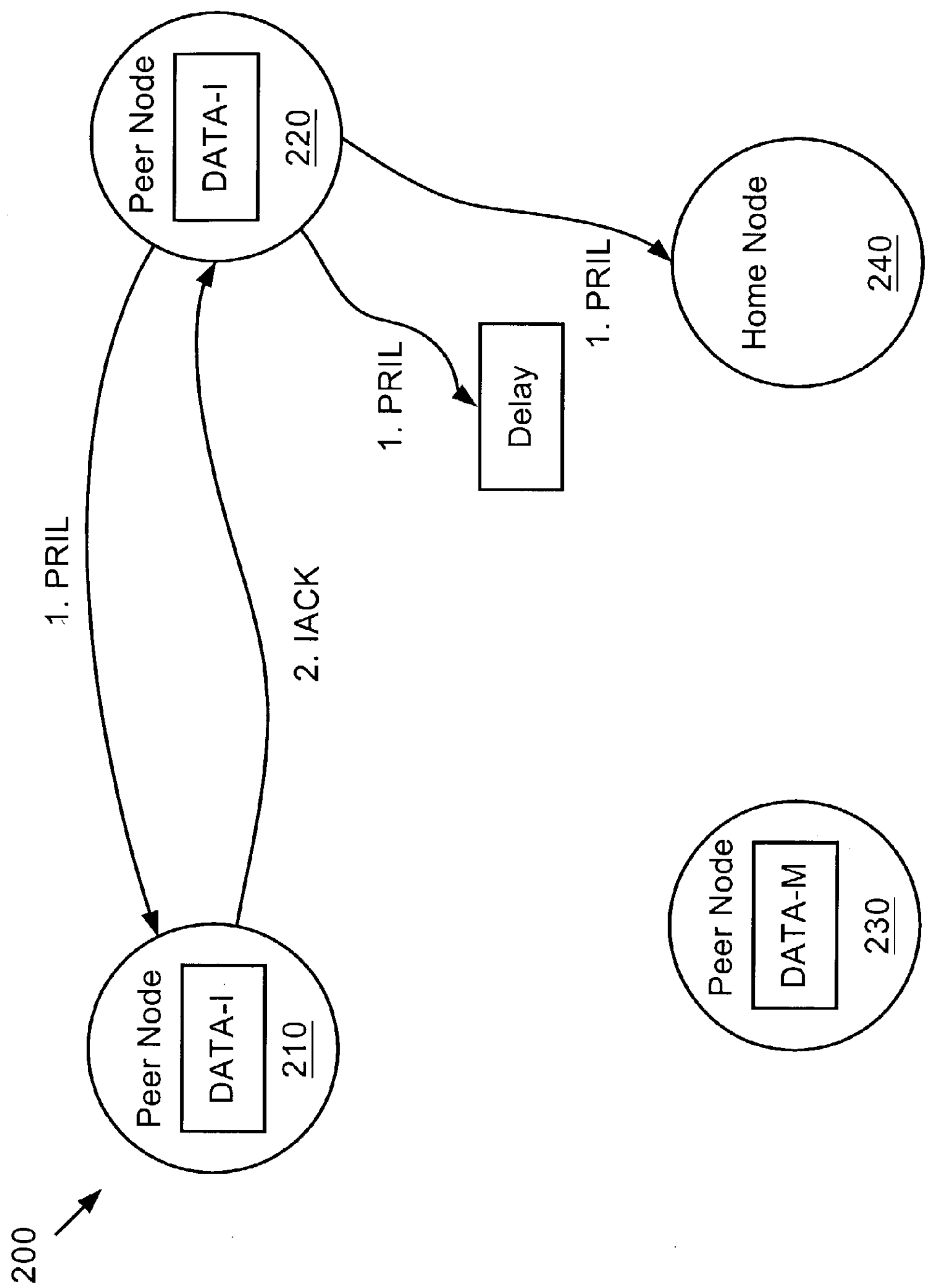
FIGS. 4*a* through 4*d* provide a conceptual illustration of a shared line conflict caused by a delay of one of multiple requests.

FIGS. 4*a* through 4*d* provide a conceptual illustration of a shared line conflict caused by a delay of one of multiple requests. As illustrated in FIG. 4*a*, peer node 220 transmits a PRIL message to peer nodes 210 and 230 and to home node 240 requesting a block of data. The PRIL message intended for peer node 230 is delayed. The delay can be the result of, for example, system latency, packet corruption, or any other reason. Peer node 210 responds to the PRIL message with an IACK message indicating that peer node 210 does not store a valid copy of the requested data.

Figure 4B:
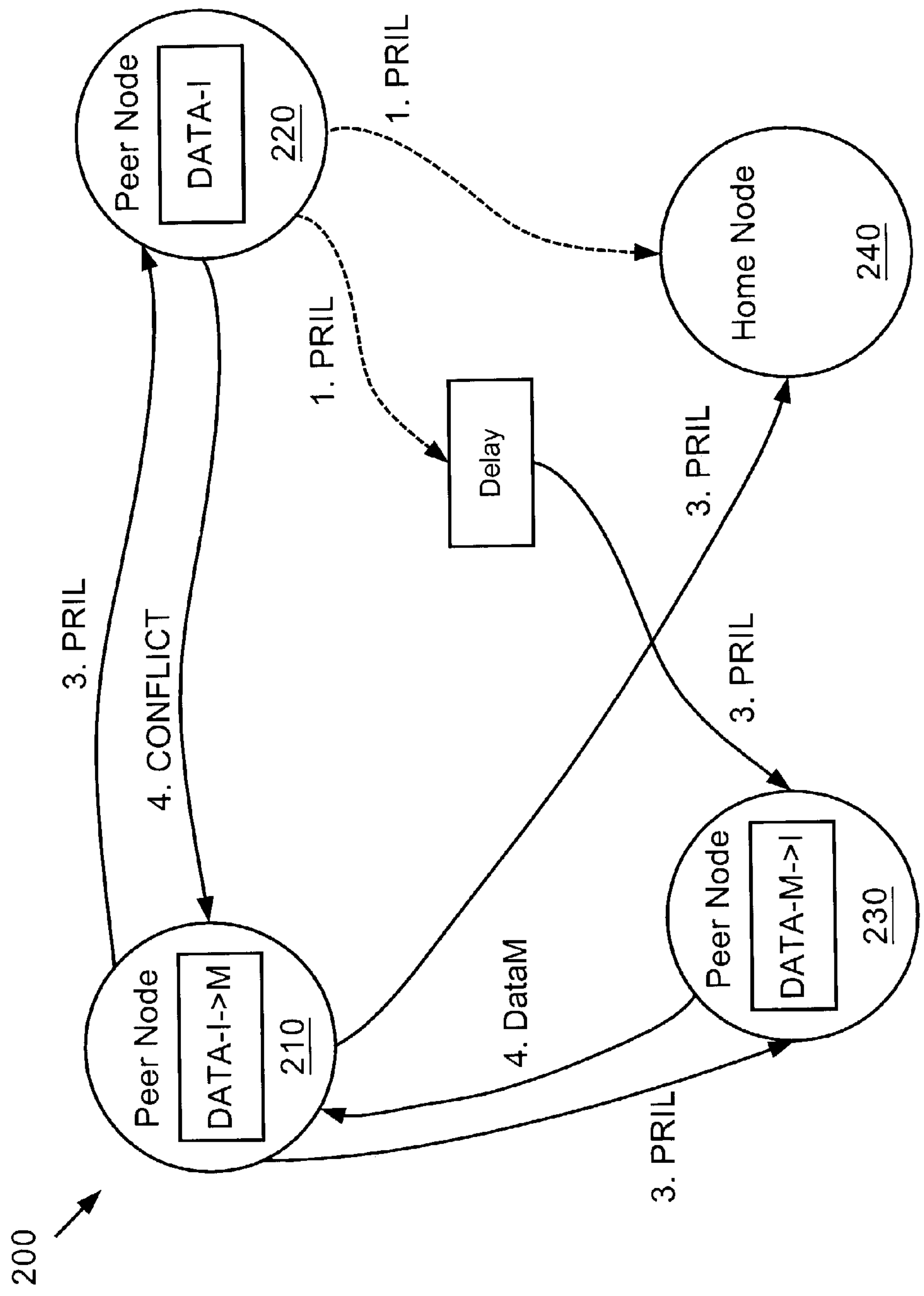

As illustrated in FIG. 4*b*, peer node 210 transmits a PRIL message to peer nodes 220 and 230 and to home node 240 requesting the same block of data. The delayed PRIL message from peer node 220 is received by peer node 230 at the same time or after the PRIL message from peer node 210. Peer node 230 responds to the PRIL message from peer node 210 with a DataM message that provides a copy of the requested data to peer node 210 and causes peer node 210 to store the data in the M state. Peer node 230 marks a retained copy, if any, of the requested data in the I state. Peer node 220 responds to the PRIL message from peer node 210 with a CONFLICT message indicating to peer node 210 that peer node 220 has detected a conflict between requests by the two nodes.

Figure 4C:
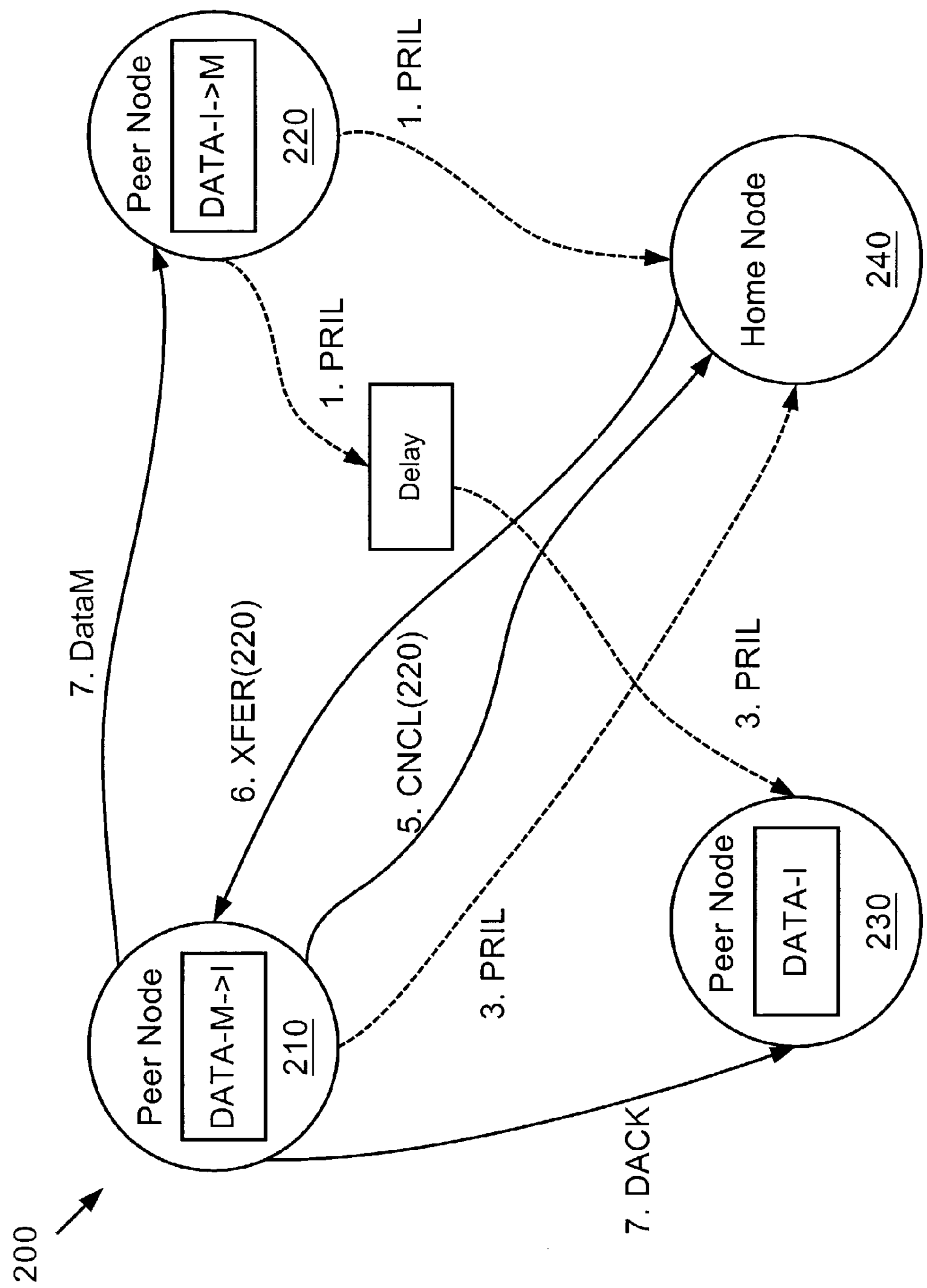

As illustrated in FIG. 4*c*, peer node 210 sends a CNCL (220) message to home node 240 to cancel retrieval of the requested data from memory. The CNCL(220) message also indicates to home node 240 that a conflict exists between peer node 210 and peer node 220. Home node 240 responds to the CNCL(220) message with a XFER(220) message that causes peer node 210 to send a copy of the requested data to peer node 220. In one embodiment, peer node 210 uses and/or modifies the requested block of data before sending a copy of the data to peer node 220. In an alternate embodiment, peer node 210 sends a copy of the data to peer node 220 immediately.

Peer node 210 transmits a DACK message to peer node 230 to acknowledge receipt of the requested data. Peer node 210 also sends a DataM message to peer node 220 to provide a copy of the requested data. Peer node 220 stores the requested data in the M state while peer node 210 marks any remaining copy of the requested data in the I state.

Figure 4D:
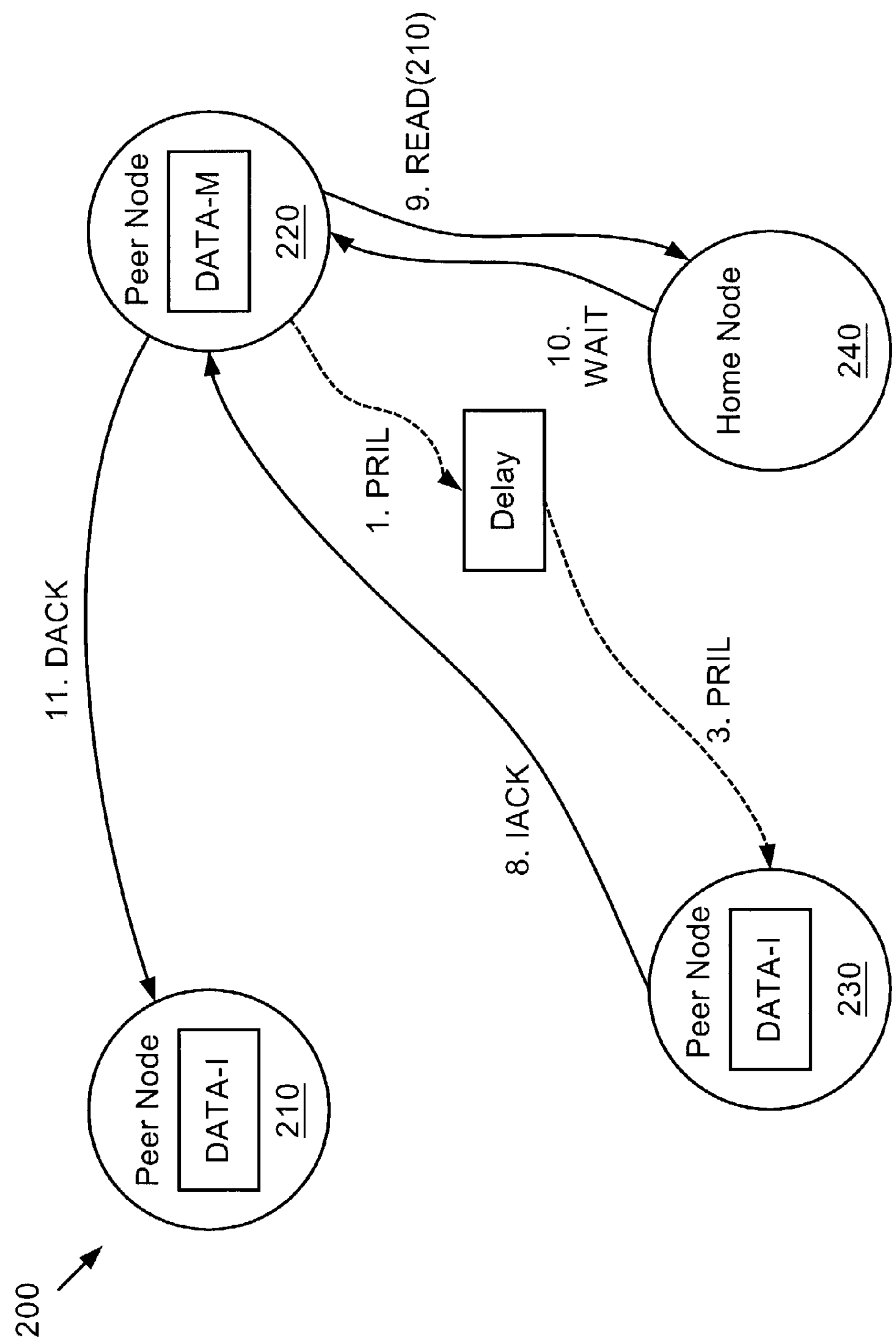

As illustrated in FIG. 4*d*, peer node 230 sends an IACK message to peer node 220 in response to receiving the DACK message from peer node 210. The IACK message indicates that peer node 230 does not store a valid copy of the requested data. Peer node 220 sends a READ(210) message to home node 240. The READ(210) message cancels retrieval of the requested data from memory and indicates to home node 240 that peer node 220 has a conflict with peer node 210.

Home node 240 responds to the READ(210) message with a WAIT message that causes peer node 220 to pause a predetermined period of time before sending any subsequent messages. Peer node 220 responds to the DataM message from peer node 210 with a DACK message, which acknowledges receipt of the requested data from peer node 210.

Figure 5A:
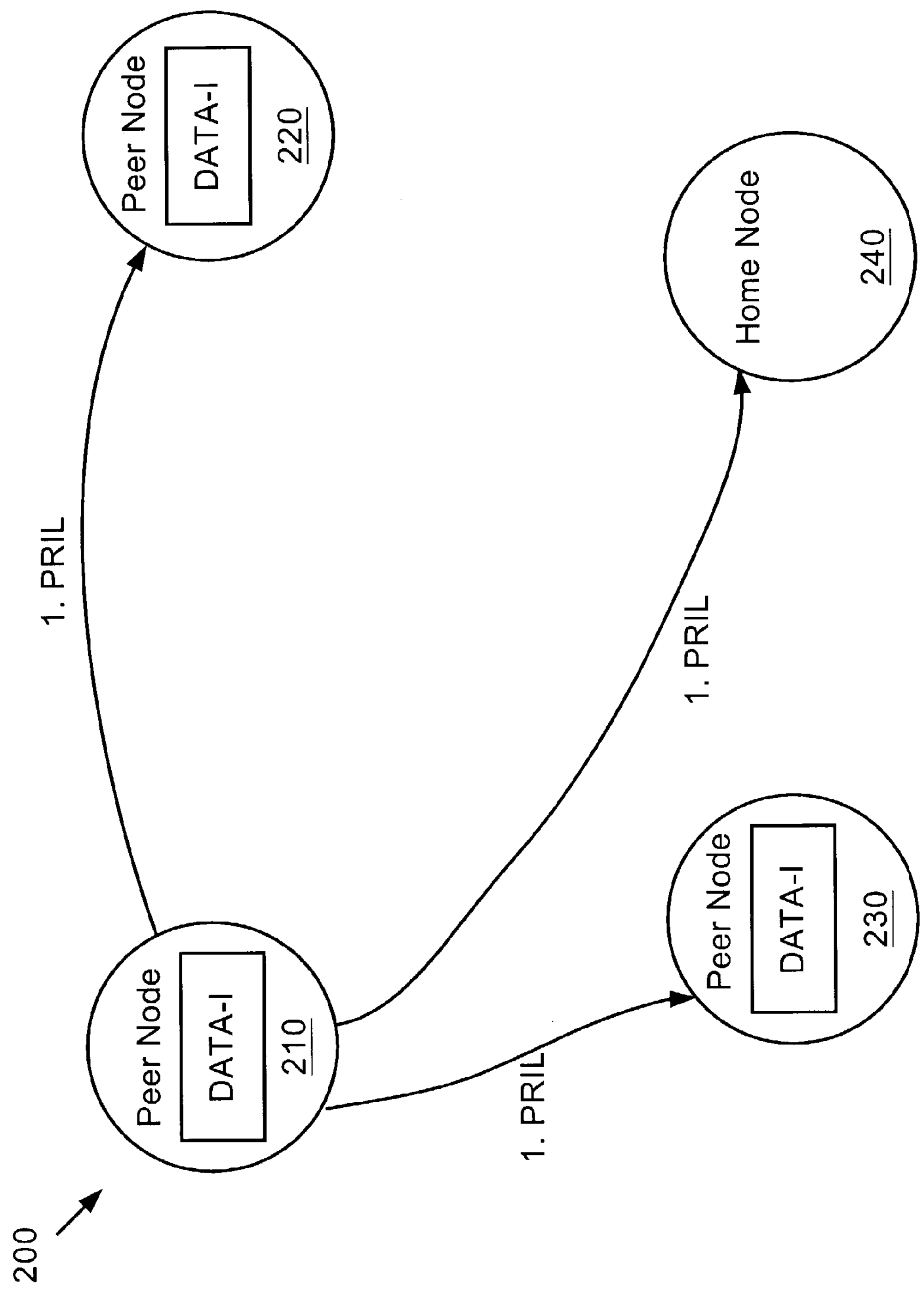
FIGS. 5*a* through 5*d* provide a conceptual illustration of an invalid line conflict.
Figure 5B:
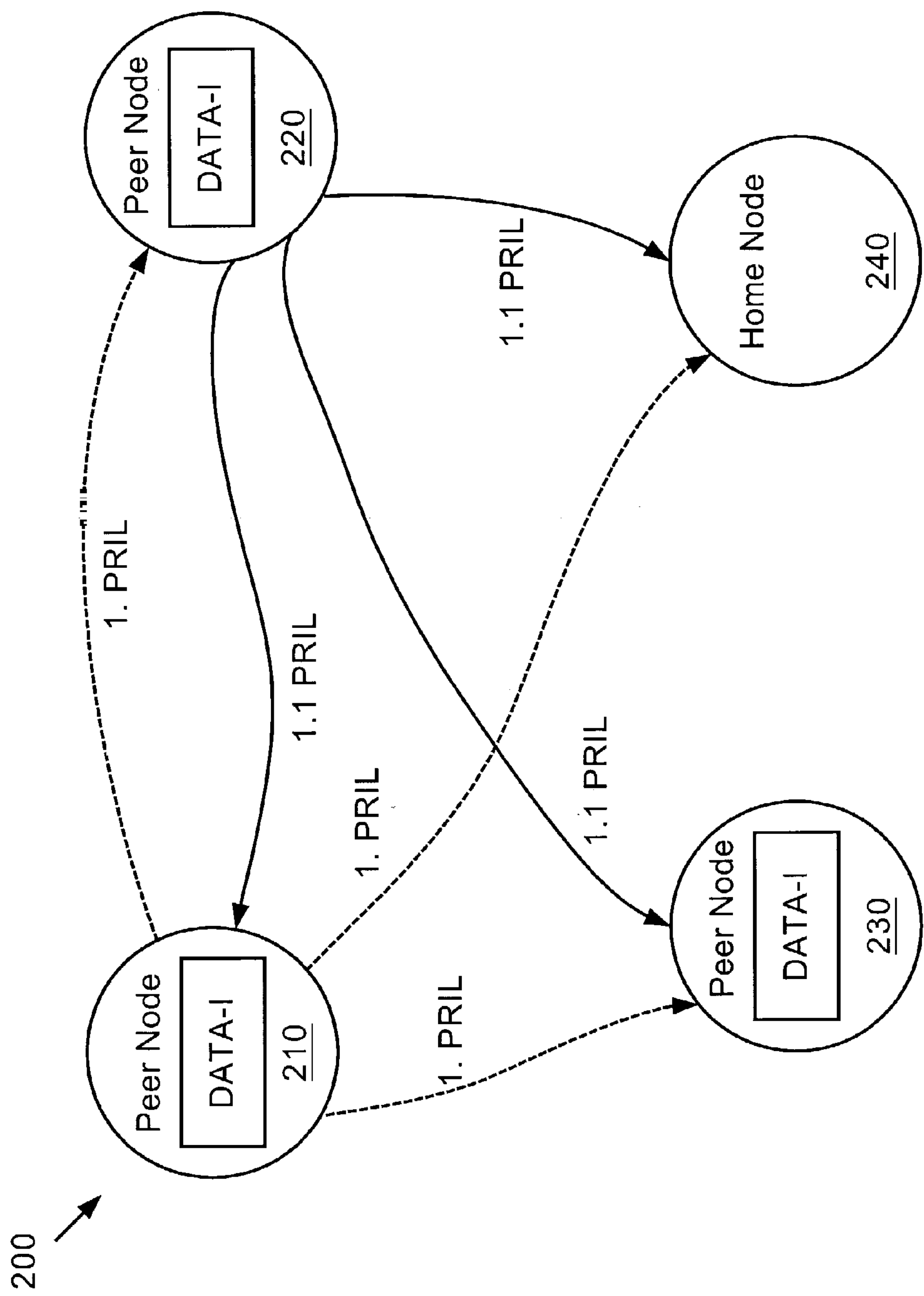

FIGS. 5*a* through 5*d* provide a conceptual illustration of an invalid line conflict. As illustrated in FIG. 5*a*, peer node 210 transmits a PRIL message to request a block of data to peer nodes 220 and 230 and to home node 240. As illustrated in FIG. 5*b*, at the same time, or soon after the PRIL message from peer node 210, peer node 220 transmits a PRIL message requesting the same data to peer nodes 210 and 230 and to home node 240.

Figure 5C:
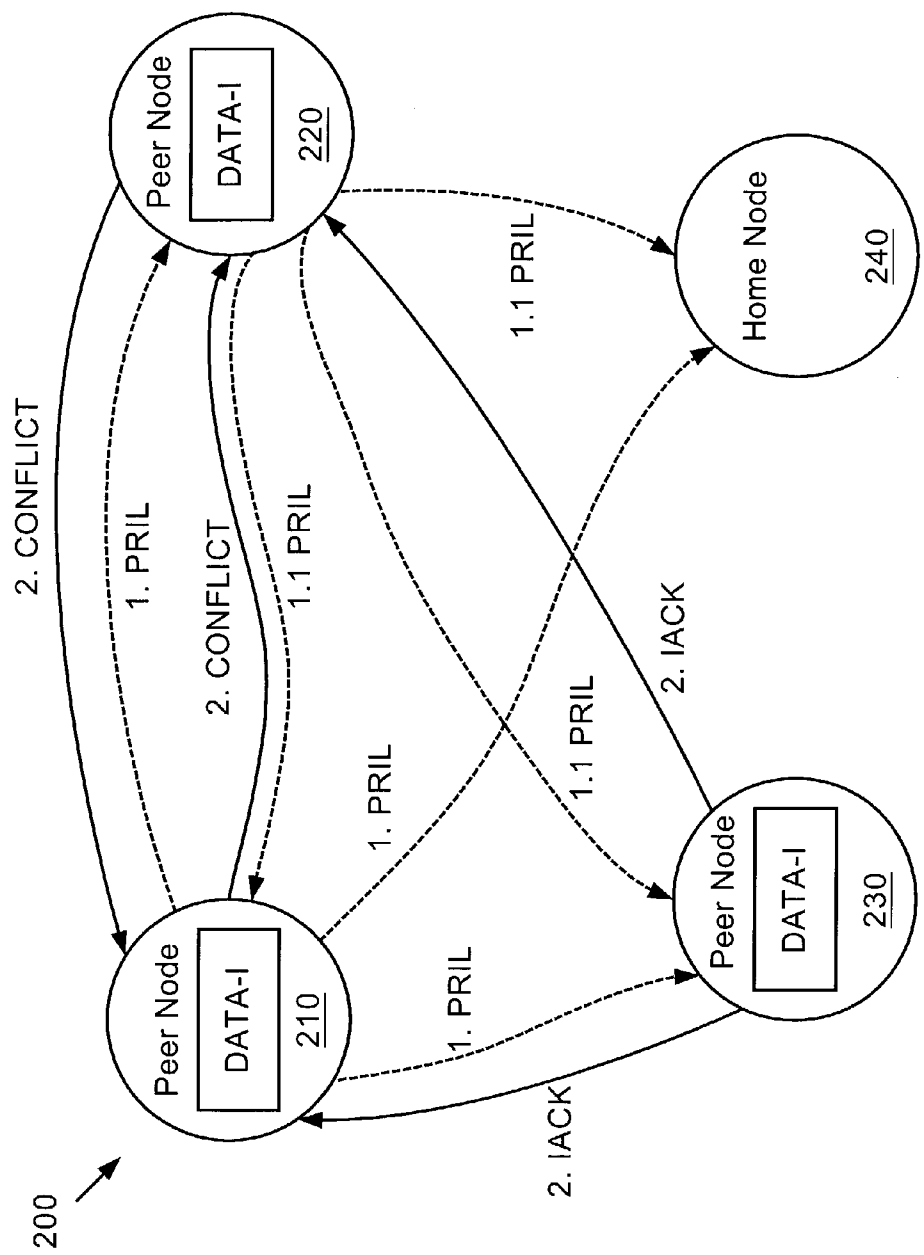

As illustrated in FIG. 5*c*, peer node 230 responds to the PRIL message from peer node 210 with an IACK message indicating that peer node 230 does not store a valid copy of the requested data. Similarly, peer node 230 responds to the PRIL message from peer node 220 with an IACK message. Peer node 220 responds to the PRIL message from peer node 210 with a CONFLICT message to communicate the identification of a conflict between peer nodes 210 and 220. Similarly, peer node 210 responds to the PRIL message from peer node 220 with a CONFLICT message.

Figure 5D:
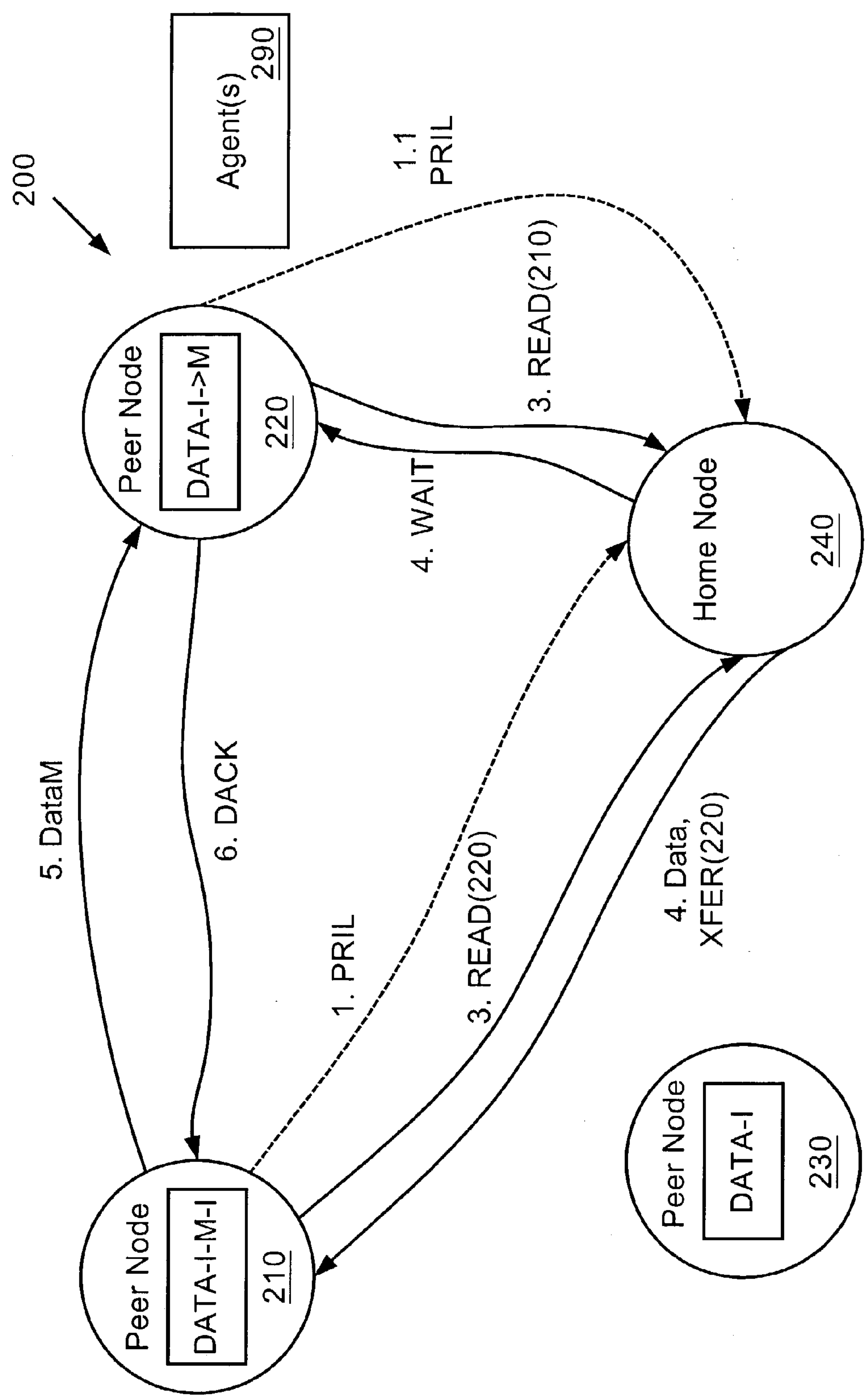

As illustrated in FIG. 5*d*, peer node 210 sends a READ (220) message to home node 240. The READ(220) message reads the previously requested data from home node 240, which has retrieved the requested data from memory. Home node 240 provides the requested data to peer node 210 with a Data,XFER(220) message. In one embodiment, home node 240 includes information from two types of messages (i.e., Data and XFER) into a single message packet. This "piggybacking" technique can reduce the bandwidth required to resolve conflicts.

The Data,XFER(220) message provides the requested data to peer node 210 and also causes peer node 210 to transfer the requested data to peer node 220. When peer node 210 receives the requested data, the requested data is stored in the M state.

After receiving the requested data, peer node 210 sends a copy of the requested data to peer node 220 with a DataM message. Any copy of the requested data retained by peer node 210 is marked in the I state. Peer node 220 stores the requested data in the M state and acknowledges receipt of the requested data with a DACK message to peer node 210.

Figure 6A:
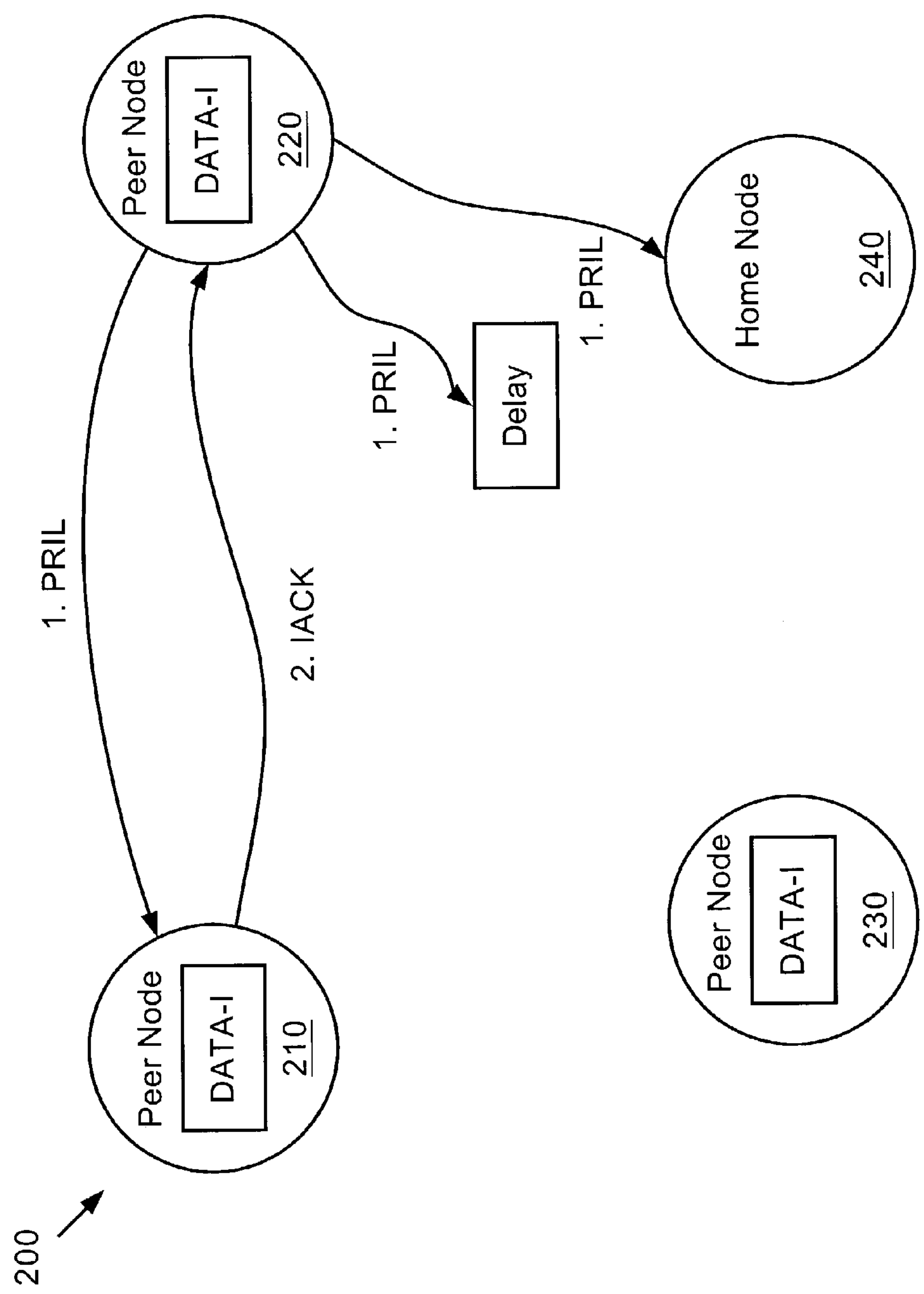
FIGS. 6*a* through 6*d* provide a conceptual illustration of an invalid line conflict caused by a delay of one of multiple requests.

FIGS. 6*a* through 6*d* provide a conceptual illustration of an invalid line conflict caused by a delay of one of multiple requests. As illustrated in FIG. 6*a*, peer node 220 transmits a PRIL message to peer nodes 210 and 230 and to home node 240 requesting a block of data. The PRIL message intended for peer node 230 is delayed. The delay can be the result of, for example, system latency, packet corruption, or any other reason. Peer node 210 responds to the PRIL message with an IACK message indicating that peer node 210 does not store a valid copy of the requested data.

Figure 6B:
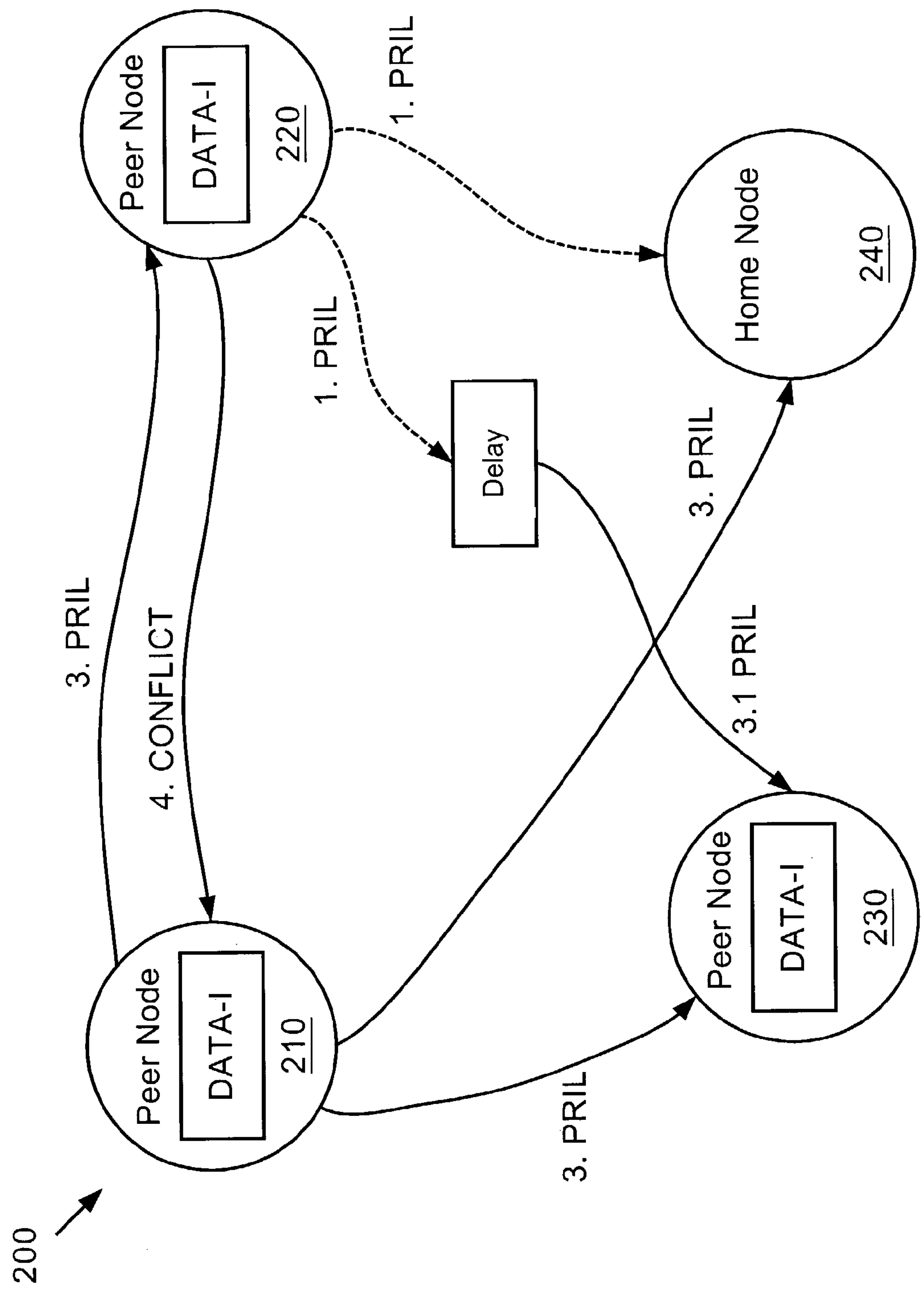

As illustrated in FIG. 6*b*, peer node 210 transmits a PRIL message to peer nodes 220 and 230 and to home node 240 requesting the same block of data. The delayed PRIL message from peer node 220 is received by peer node 230 at the same time or after the PRIL message from peer node 210. Peer node 220 responds to the PRIL message from peer node 210 with a CONFLICT message indicating to peer node 210 that peer node 220 has detected a conflict between requests by the two nodes.

Figure 6C:
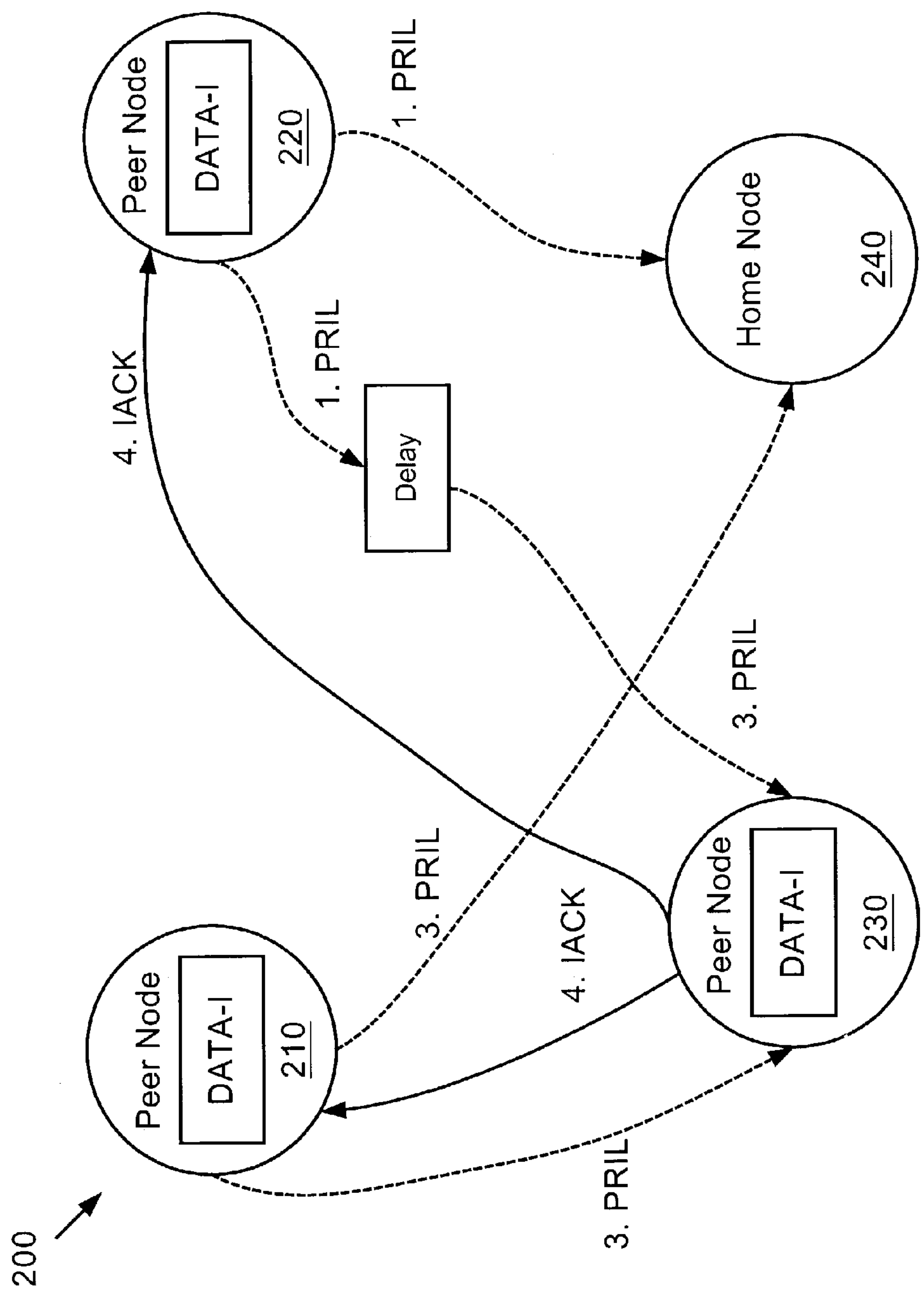

As illustrated in FIG. 6*c*, peer node 230 responds to the PRIL message from peer node 210 with an IACK message indicating that peer node 230 does not store a valid copy of the requested data by peer node 210. Similarly, peer node 230 responds to the PRIL message from peer node 220 with an IACK message indicating that peer node 230 does not store a valid copy of the requested data by peer node 220.

Figure 6D:
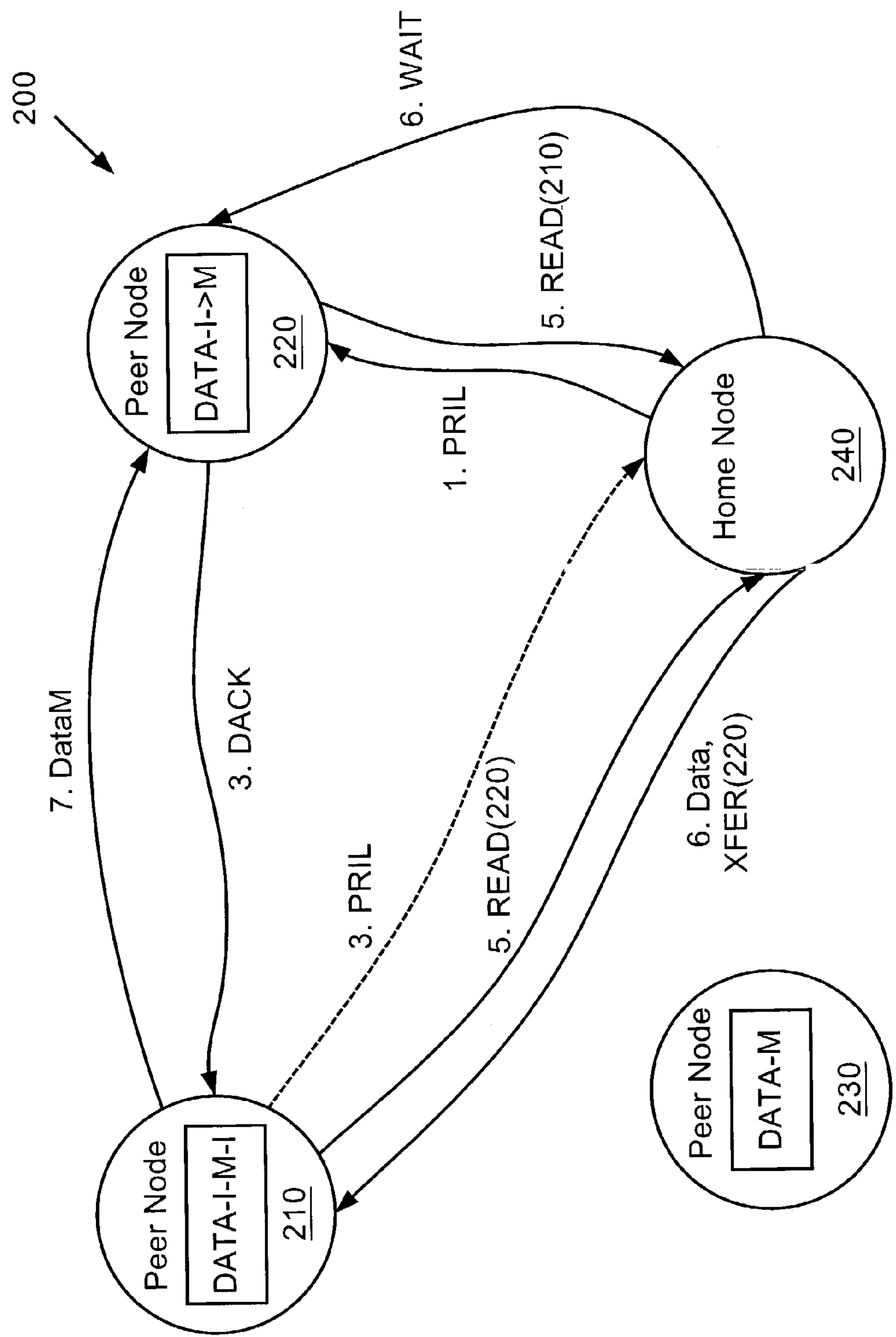

As illustrated in FIG. 6*d*, peer node 210 sends a READ (220) message to home node 240. The READ(220) message reads the previously requested data from home node 240, which has retrieved the requested data from memory. Home node 240 provides the requested data to peer node 210 with a Data,XFER(220) message.

After receiving the requested data, peer node 210 sends a copy of the requested data to peer node 220 with a DataM message. Any copy of the requested data retained by peer node 210 is marked in the I state. Peer node 220 stores the requested data in the M state and acknowledges receipt of the requested data with a DACK message to peer node 210.

Example Systems to Support Speculative Distributed Conflict Resolution

Figure 7:
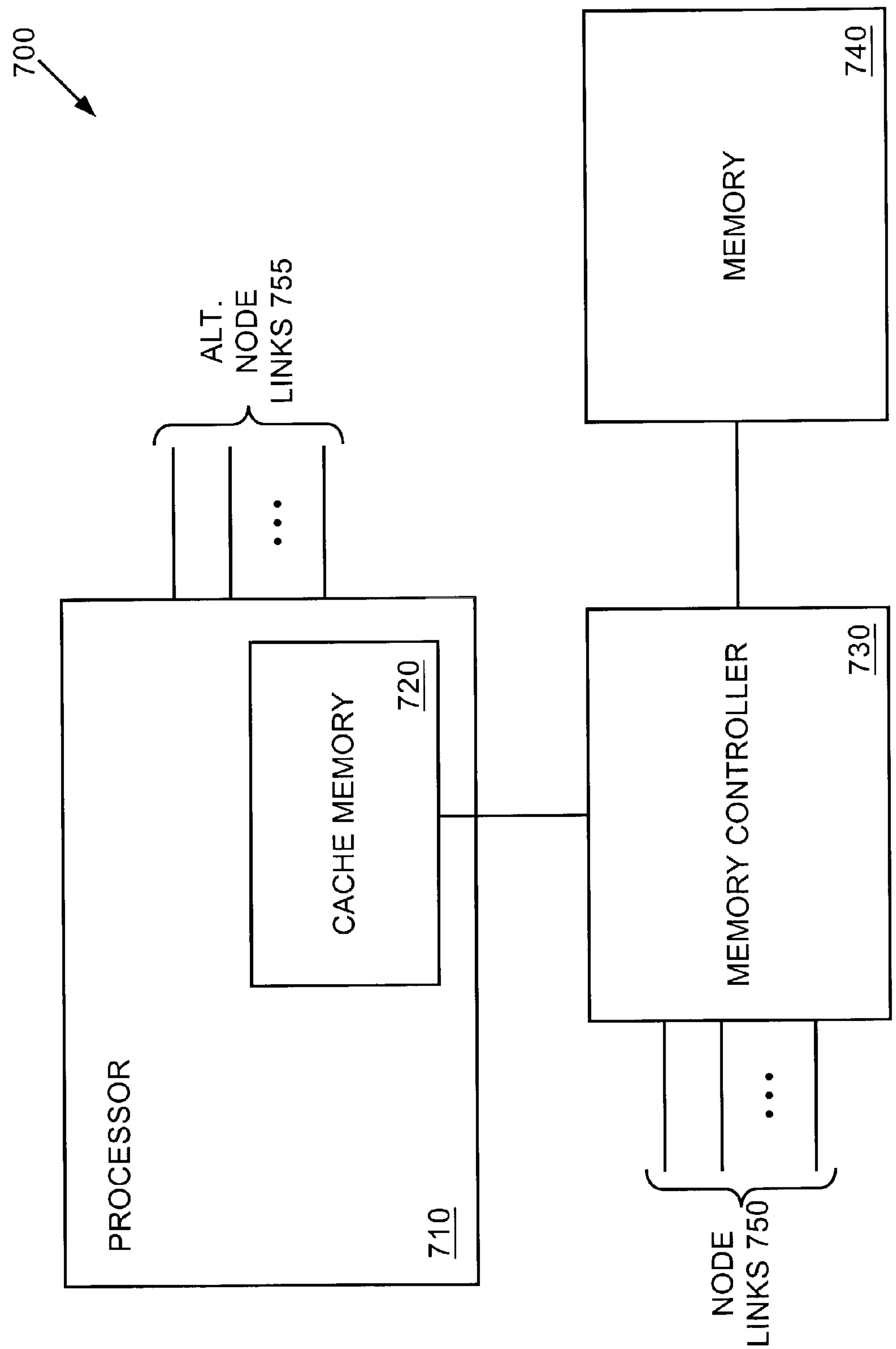
FIG. 7 is a block diagram of one embodiment of a node.

FIG. 7 is a block diagram of one embodiment of a node. Node 700 is illustrated with a single processor, cache memory, memory controller and memory; however, any number of any of these components can be included in a node. Further, additional and/or different components (e.g., a bus bridge) can also be included in a node.

Processor 710 can be any type of processor known in the art. In one embodiment, processor 710 includes cache memory 720. In alternate embodiments, cache memory 720 is external to processor 710, or additional cache memories can be included that are internal or external to processor 710.

Memory controller 730 is coupled with cache memory 720 and memory 740. Memory controller 730 operates as an interface between cache memory 720 and memory 740. In one embodiment, memory controller 730 maintains cache coherency according to the cache coherency protocol described herein. Memory controller 730 interacts with other nodes via node links 750. In an alternate embodiment, processor 710 interacts with memory controller 730 to maintain cache coherency as described herein and processor 710 interacts with other nodes via alternative node links 755.

In one embodiment, node links 750 include a dedicated interface for each node with which node 700 interacts. In an alternate embodiment, node links 750 include a number of interfaces that is different than the number of nodes with which node 700 interacts. In one embodiment, node 700 interacts with one or more agents that represent multiple nodes.

Figure 8:
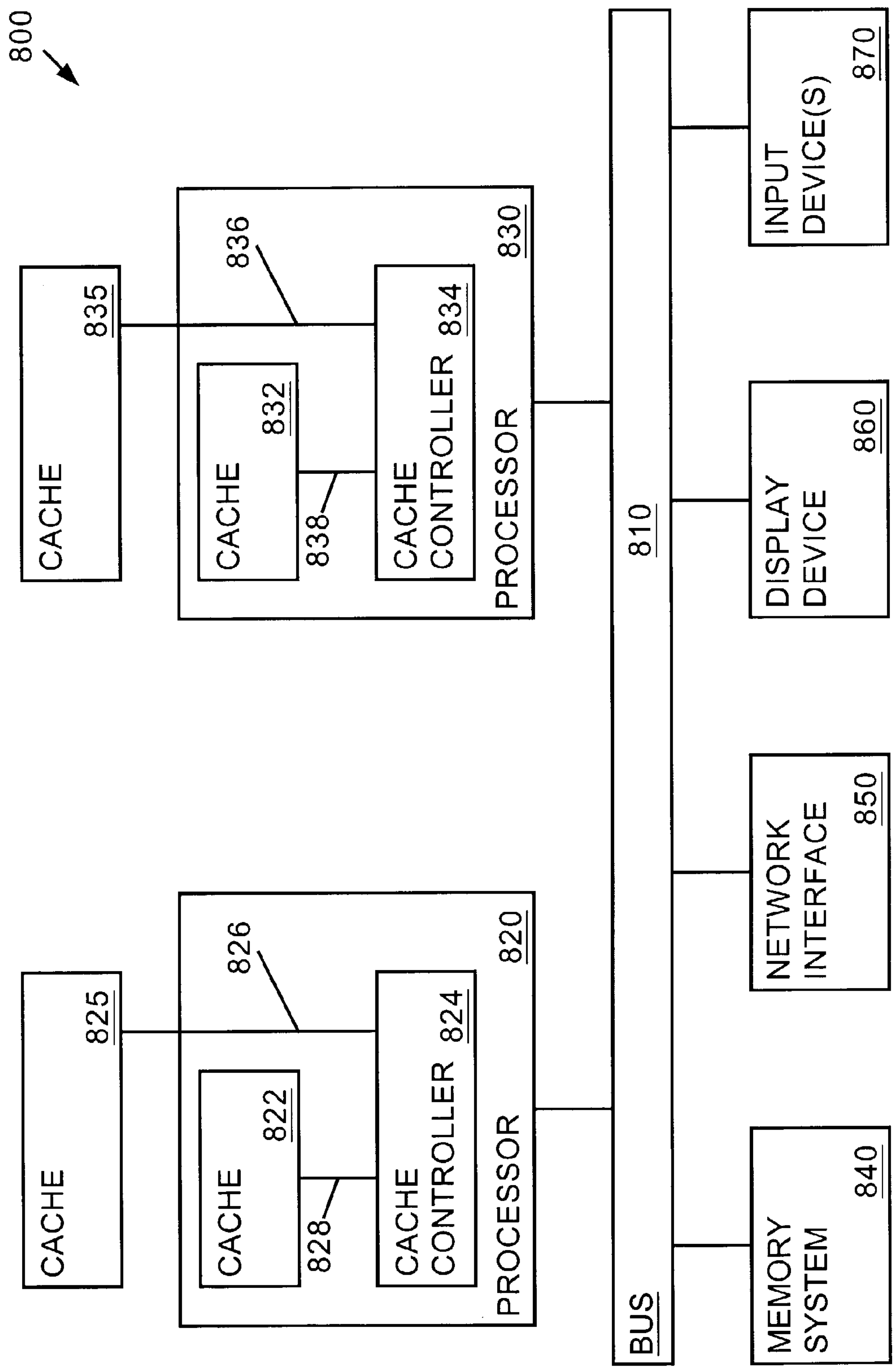
FIG. 8 is one embodiment of a multiprocessor system.

FIG. 8 is one embodiment of a multiprocessor system. Multiprocessor system 800 is intended to represent a range of systems having multiple processors, for example, computer systems, real-time monitoring systems, etc. Alternative multiprocessor systems can include more, fewer and/or different components. In certain situations, the cache management techniques described herein can be applied to both single processor and to multiprocessor systems. Multiprocessor system 800 can be configured to operate as a multi-node system.

Multiprocessor system 800 includes bus system 810 or other communication device(s) to communicate information. Bus system 810 can include any number of buses and associated interconnection circuitry, for example, bus bridges. Processor 820 is coupled with bus system 810 to process information. Processor 820 can include cache memory 822, for example a level zero (L0) cache memory, and cache controller 824. In one embodiment, processor 820 is also coupled with cache 825, which can be any type of cache memory. In an alternate embodiment, cache 825 can be coupled with bus system 810. Other types of processor-cache configurations can also be used.

In one embodiment, cache controller 824 is coupled with cache memory 822 via cache memory interface 828, which can be, for example, a bus internal to processor 820. Cache controller is coupled with cache memory 825 via cache interface 826, which provides an interface between processor 820 and an external cache memory.

Multiprocessor system 800 further includes processor 830 with cache memory 832 and cache controller 834. Cache controller 834 is coupled with cache memory 832 via cache interface 838. Similarly, cache controller 834 is coupled with cache memory 835 via cache interface 836. In one embodiment, cache memory 835 is coupled with processor 830.

While multiprocessor system 800 is illustrated with two processors, multiprocessor system 800 can include any number of processors and/or co-processors. Multiprocessor system 800 further includes memory system 840 coupled with bus system 810. Memory system 840 can include any combination of dynamic (e.g., random access memory) and static (e.g., read-only memory, CD-ROM, disk storage, flash memory) memory devices and associated drives, where appropriate. The memory devices of memory system 840 are used to store information and instructions to be executed by processors of multiprocessor system 800. Memory system 840 also can be used to store temporary variables or other intermediate information during execution of instructions by the processors.

Instructions can be provided to memory system 840 from a static or remote storage device, such as magnetic disk, a read-only memory (ROM) integrated circuit, CD-ROM, DVD, via a remote connection that is either wired or wireless, etc. In alternative embodiments, hard-wired circuitry can be used in place of or in combination with software instructions. Thus, execution of sequences of instructions is not limited to any specific combination of hardware circuitry and software instructions.

Multiprocessor system 800 further includes network interface 850 to provide access to a network, such as a local area network and/or the Internet. Network interface 850 can provide wireless and/or wired network interfaces, which can include communication of instructions to and/or from remote electronically-accessible media. An electronically-accessible medium includes any mechanism that provides (i.e., stores and/or transmits) content (e.g., computer executable instructions) in a form readable by an electronic device (e.g., a computer, a personal digital assistant, a cellular telephone).

For example, a machine-accessible medium includes read only memory (ROM); random access memory (RAM); magnetic disk storage media; optical storage media; flash memory devices; electrical, optical, acoustical or other form of propagated signals (e.g., carrier waves, infrared signals, digital signals).

Multiprocessor system 800 can also include display device 860, such as a cathode ray tube (CRT) or liquid crystal display (LCD), to display information. Input device(s) 870, including, for example, a keyboard having alphanumeric and other keys, is typically coupled to bus 810 to communicate information and command selections to processors 820 and/or 830. Another type of user input device is a cursor control device, such as a mouse, a trackball, or cursor direction keys to communicate direction information and command selections to processors 820 and 830 and to control cursor movement on display device 860.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:

transmitting, from a first peer node to a plurality of nodes of a multi-node system, a first data request message to request a copy of a block of data, wherein the plurality of nodes having peer nodes including the first peer node and a second peer node, wherein the plurality of nodes further having a home node that stores the block of data in a non-cache memory;

transmitting, from the second peer node to the plurality of nodes, a second data request message to request a copy of the block of data;

determining a conflict between the first data request message and the second data request message corresponding to the first and second peer nodes, respectively, wherein the first and second peer nodes are regarded as conflicting nodes;

reporting the conflict to the home node, the home node to prepare conflict reports and issue forwarding instructions to assure each of the first and second peer nodes receive the requested copy of the block of data;

providing a copy of the block data from the home node if none of the peer nodes stores a sharable copy of the block data; and providing a copy of the block data from a peer node storing a copy of the block data in a forward state, wherein only one of multiple copies of the block data stored by multiple peer nodes is designated in the forward state as a single cached copy of the block of data to be used to respond to the first and second data request messages.

2. The method of claim 1 wherein the block of data comprises a cache line.

3. The method of claim 1 wherein the first peer node transmits the first data request message to a first agent that represents the plurality of nodes.

4. The method of claim 1 wherein the second peer node transmits the second data request message to a second agent that represents the plurality of nodes.

5. The method of claim 1, further comprising once the conflict is determined, initiating a blackout period for responding to the first and data request messages until an acknowledgement message is received from the home node guaranteeing that the conflicting nodes are aware of the conflict.

6. A processor comprising:

a control circuit coupled with an interface to transmit a first request message for a copy of a block of data from a first peer node to a plurality of peer nodes, the control circuit to detect a conflict between the transmitted request for the copy of the block of data of the first peer node and a second request message received from a second peer node of the plurality of peer nodes, wherein in response to detecting the conflict between the first and second request messages corresponding to the first and second peer nodes that are regarded as conflicting nodes, the control circuit sends a message to a home node that stores the block of data in a non-cache memory, the message including an identifier of the second peer node to indicate to the home node the conflict between the conflicting nodes as detected by the control circuit, wherein the home node to provide a copy of the block data if none of the peer nodes stores a sharable copy of the block data, or a peer node of the plurality of peer nodes to provide a copy of the block data, the peer node storing a copy of the block data in a forward state, wherein only one of multiple copies of the block data stored by multiple peer nodes is designated in the forward state as a single cached copy of the block of data to be used to respond to the first and second data request messages.

7. The processor of claim 6 wherein the interface is coupled with the plurality of peer nodes and the home node, wherein the first and second peer nodes are coupled with other peer nodes.

8. The processor of claim 6 wherein the plurality of peer nodes is represented by one or more peer agents.

9. The processor of claim 6 wherein the home node is represented by a home agent.

10. The processor of claim 6, wherein the control circuit is further to initiate a blackout period for responding to the first and data request messages until an acknowledgement message is received from the home node guaranteeing that the conflicting nodes are aware of the conflict.

11. A computer system comprising:

an interface coupled with a plurality of peer nodes and a home node; and a control circuit coupled with the interface to transmit a first request message for a copy of a block of data from a first peer node to the plurality of peer nodes, the control circuit to detect a conflict between the transmitted request for the copy of the block of data of the first peer node and a second request message received from a second peer node of the plurality of peer nodes, wherein in response to detecting the conflict between the first and second request messages corresponding to the first and second peer nodes that are regarded as conflicting nodes, the control circuit sends a message to a home node that stores the block of data in a non-cache memory, the message including an identifier of the second peer node to indicate to the home node the conflict between the conflicting nodes as detected by the control circuit, wherein the home node to provide a copy of the block data if none of the peer nodes stores a sharable copy of the block data, or a peer node of the plurality of peer nodes to provide a copy of the block data, the peer node storing a copy of the block data in a forward state, wherein only one of multiple copies of the block data stored by multiple peer nodes is designated in the forward state as a single cached copy of the block of data to be used to respond to the first and second data request messages.

12. The computer system of claim 11 wherein the interface is coupled with the plurality of peer nodes and the home node, wherein the first and second peer nodes are coupled with other peer nodes.

13. The computer system of claim 11 wherein the plurality of peer nodes is represented by one or more peer agents.

14. The computer system of claim 11 wherein the home node is represented by a home agent.

15. The computer system of claim 11, wherein the control circuit is further to initiate a blackout period for responding to the first and data request messages until an acknowledgement message is received from the home node guaranteeing that the conflicting nodes are aware of the conflict.

* * * * *